United States Patent
Kazmi et al.

(10) Patent No.: US 9,560,608 B2
(45) Date of Patent: Jan. 31, 2017

(54) METHOD AND NETWORK NODES IN A TELECOMMUNICATION SYSTEM

(75) Inventors: Muhammad Kazmi, Bromma (SE); Olav Queseth, Solna (SE); Erika Tejedor, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 238 days.

(21) Appl. No.: 14/114,921

(22) PCT Filed: Oct. 6, 2011

(86) PCT No.: PCT/SE2011/051195
§ 371 (c)(1),
(2), (4) Date: Oct. 31, 2013

(87) PCT Pub. No.: WO2012/150888
PCT Pub. Date: Nov. 8, 2012

(65) Prior Publication Data
US 2014/0066057 A1    Mar. 6, 2014

Related U.S. Application Data

(60) Provisional application No. 61/482,022, filed on May 3, 2011.

(51) Int. Cl.
*H04J 13/00* (2011.01)
*H04W 52/38* (2009.01)
(Continued)

(52) U.S. Cl.
CPC ............ *H04W 52/386* (2013.01); *H04L 5/14* (2013.01); *H04W 28/18* (2013.01); *H04W 8/10* (2013.01);
(Continued)

(58) Field of Classification Search
None
See application file for complete search history.

(56) References Cited

U.S. PATENT DOCUMENTS 8,130,711 B2 * 3/2012 Noh ............... H04W 72/0413
370/208
8,331,307 B2 * 12/2012 Bui .................. H04L 5/0053
370/204
(Continued)

FOREIGN PATENT DOCUMENTS

KR    20080061558 A    7/2008

OTHER PUBLICATIONS

3rd Generation Partnership Project, "3GPP TR 37.806 V0.8.0 (Apr. 2011)," 3rd Generation Partnership Project; Technical Specification Group Radio Access Network Extending 850MHz Study Item Technical Report (Release 9). Apr. 2011. pp. 1-61.
(Continued)

Primary Examiner — Ashish K Thomas
(74) Attorney, Agent, or Firm — Murphy, Bilak & Homiller, PLLC

(57) ABSTRACT

A method in a user equipment (140) for assisting a first radio network node (110) in selection of one or more mobility parameters, a method in the first radio network node (110) for selecting one or more mobility parameters and a user equipment (140) and a first radio network node (110) configured to perform the methods are provided. The user equipment (140) sends (C001) an indication of a second part of a first operating frequency band to the first radio network node (110). The first radio network node (110) selects (C004) said one or more mobility parameters based on the received indication of the second part of the first operating frequency band. The user equipment (140) receives (C005)
(Continued)

and applies (C006) said one or more mobility parameters from the first radio network node (110).

44 Claims, 8 Drawing Sheets

(51) Int. Cl.
    *H04W 28/18*     (2009.01)
    *H04L 5/14*     (2006.01)
    *H04W 52/02*     (2009.01)
    *H04W 52/36*     (2009.01)
    *H04W 88/02*     (2009.01)
    *H04W 8/10*     (2009.01)

(52) U.S. Cl.
    CPC ....... *H04W 52/0209* (2013.01); *H04W 52/367* (2013.01); *H04W 88/02* (2013.01)

(56) References Cited

U.S. PATENT DOCUMENTS

2004/0110536 A1* 6/2004 Ohwada .................. H04J 13/00
    455/561
2009/0274073 A1* 11/2009 Sutton .................... H04W 4/20
    370/280

OTHER PUBLICATIONS

Author Unknown, "APT Report on UHF Band Usage and Considerations for Realizing the UHF Digital Dividend," XP-002672458; The 7th APT Wireless Forum Meeting. Sep. 23-26, 2009. pp. 1-34. Phuket, Thailand.

3rd Generation Partnership Project; "3GPP TS 05.05 V8.20.0 (Nov. 2005)," 3rd Generation Partnership Project; Technical Specification Group GSM/EDGE Radio Access Network; Radio transmission and reception (Release 1999). Nov. 2011. pp. 1-100.

3rd Generation Partnership Project, "3GPP TS 25.101 V10.1.0 (Apr. 2011)," 3rd Generation Partnership Project; Technical Specification Group Radio Access Network; User Equipment (UE) radio transmission and reception (FDD) (Release 10). Apr. 2011. pp. 1-271.

3rd Generation Partniship Project, "3GPP TS 25.104 V10.1.0 (Apr. 2011)," 3rd Generation Partnership Project; Technical Specification Group Radio Access Network; Base Station (BS) radio transmission and reception (FDD) (Release 10). Apr. 2011. pp. 1-90.

3rd Generation Partnership Project, "DRAFT3GPP TS 36.101 V10. 2.0 (Mar. 2011)," 3rd Generation Partnership Project; Technical Specification Group Radio Access Network; Evolved Universal Terrestrial Radio Access (E-UTRA); User Equipment (UE) radio transmission and reception (Release 10). Mar. 2011. pp. 1-225.

3rd Generation Partnership Project, "3GPP TS 36.104 V10.2.0 (Apr. 2011)," 3rd Generation Partnership Project; Technical Specification Group Radio Access Network; Evolved Universal Terrestrial Radio Access (E-UTRA); Base Station (BS) radio transmission and reception (Release 10). Apr. 2011. pp. 1-101.

* cited by examiner

METHOD AND NETWORK NODES IN A TELECOMMUNICATION SYSTEM

TECHNICAL FIELD

The present invention relates to methods and procedures to enable the operation and roaming of the UEs supporting certain operating frequency band. However, different UEs supporting the same band may bear different radio characteristics pertaining to that band.

BACKGROUND

Usage of radio spectrum, or spectrum for short, is regulated independently within different countries, or regions. An authority regulating spectrum usage in a certain region may be referred to as a regulator. Radio communication systems, such as cellular telecommunication systems, are developed and designed for different spectrum ranges, or operating bands. An operating band may be referred to as an operating frequency band.

An operating frequency band supports a specific duplex mode of operation. The possible duplex modes are frequency division duplex (FDD), time division duplex (TDD) and half duplex FDD (HD-FDD). In FDD mode of operation, which is used in Universal Terrestrial Radio Access Networks (UTRAN) FDD and Evolved Universal Terrestrial Radio Access Networks (E-UTRAN) FDD, the uplink and downlink transmission take place on different carrier frequencies. Reference is made to Third Generation Partnership Project (3GPP) TS 25.101, "User Equipment (UE) radio transmission and reception (FDD)", 3GPP TS 25.104, "Base station (BS) radio transmission and reception (FDD)", and 3GPP TS 36.101, "Evolved Universal Terrestrial Radio Access (E-UTRA) and Evolved Universal Terrestrial Radio Access (E-UTRAN); User Equipment (UE) radio transmission and reception" and 3GPP TS 36.104, "Evolved Universal Terrestrial Radio Access (E-UTRA) and Evolved Universal Terrestrial Radio Access (E-UTRAN); Base station (BS) radio transmission and reception". Therefore, in FDD mode both uplink and downlink transmission can occur simultaneously in time. The carrier frequencies used in the uplink and the downlink are referred to as pass band for uplink and downlink, respectively. The minimum distance in frequency between the uplink and downlink pass bands is referred to as a duplex gap. The distance in frequency between the uplink and downlink carrier frequencies is referred to transmit-receive (TX-RX) frequency separation for the radio transmitter. The TX-RX frequency separation can be fixed, aka default, or variable. In the latter case the TX-RX frequency separation is configurable by the network.

On the other hand in TDD mode, which is used in UTRAN TDD and E-UTRAN TDD, the uplink and downlink transmission take place on the same carrier frequency channel but in different time slots or sub-frames. Reference is made to 3GPP TS 36.101, "Evolved Universal Terrestrial Radio Access (E-UTRA) and Evolved Universal Terrestrial Radio Access (E-UTRAN); User Equipment (UE) radio transmission and reception", 3GPP TS 36.104, "Evolved Universal Terrestrial Radio Access (E-UTRA) and Evolved Universal Terrestrial Radio Access (E-UTRAN); Base station (BS) radio transmission and reception" and 3GPP TS 05.05, "Radio Transmission and Reception".

HD-FDD, which is used in Global System for Mobile Communications (GSM), can be regarded as a hybrid scheme where the uplink and downlink are transmitted on different carrier frequencies and are also transmitted on different time slots. Reference is made to 3GPP TS 05.05, "Radio Transmission and Reception". This means uplink and downlink transmission do not occur simultaneously in time.

Returning to spectrum usage, one of the objectives of standardizing spectrum usage is to develop an operating band which can, preferably, be used globally. A global operating band leads to several advantages in terms of global roaming, reduced cost of the products due to the economy of scale, simplicity in building products/devices since the same, or at least at limited number of, platforms/devices can be reused globally or regionally etc. For each platform, a lot of research and development is required. Thus, a large number of platforms increase cost. However, certain region specific and even operator specific frequency bands are unavoidable due to the fact that the spectrum availability for mobile services may be fragmented in different countries and even within a country. The mobile services are typically operated by the cellular telecommunication systems. Furthermore, the regulators in each country independently allocate the frequency band in accordance with the available spectrum.

The spectrum below 1 GHz, might be scarce or fragmented due to higher demand by other competing technologies due to its favorable propagation characteristics. The assigned spectrum is eventually standardized in 3GPP in terms of frequency bands so that vendors can develop products, such as base stations and user equipments. Expressed differently, the standardized frequency band is written into 3GPP specifications. Hence, there may be a frequency band that is completely allocated in one region while a different region just allocates part of it. For example, Band 5 is widely used. However, only a sub-band of it is used in Region B, which is called Band 19. Band 5 and band 19 are known from 3GPP terminology. FIG. 1 shows a block diagram illustrating a frequency arrangement for band 5 and band 19. The numbers at the ends of each rectangle indicate frequency in MHz and the arrows in each rectangle indicate uplink for an arrow pointing upwards, and downlink for an arrow pointing downwards. The meaning of the arrows applies to FIG. 2 below as well.

One more example of a scarce or fragmented spectrum portion is that of the frequency allocation in the range of 700 MHz, i.e. 700-799 MHz. In the range of 700 MHz, there is potential for a new frequency band Asia Pacific region (APAC). Related to this new frequency band, it is desired to harmonize the use of a band in the range of 798-806 MHz. This band has previously been used mainly for TV broadcasting. The regulatory work is managed by APT (Asia Pacific Telecommunity) Wireless Group (AWG). Since the agreements made in the AWG are not legally binding for member states of the AWG, each individual country may still implement their own band arrangement.

One arrangement for the band is to use 703-748 MHz in uplink and 758-803 MHz in downlink when using FDD. There is also a TDD allocation for the band covering 698-806 MHz.

APAC is a large region and therefore it is difficult to have the same spectrum allocation in all countries in the region. Thus, in some countries it is expected that the allocation may be a subset of the full band of 798-806 MHz, and in some countries it is expected that the allocation may be the full spectrum of 798-806 MHz. For example, some region (e.g. region B) may allocate only parts of the band for communication according to International Mobile Telecommunications (IMT). As an example, the uplink may be placed in 715-750 MHz and the downlink in 770-805 MHz in region B. FIG. 2 shows another block diagram illustrating the frequency arrangements relating to the 700 MHz band for AWG, say region A, and region B.

An operating frequency band comprises a number of carrier frequencies. The carrier frequencies in a frequency band are enumerated. The enumeration is standardized such that the combination of the frequency band and the carrier frequency can be determined by a unique number called absolute radio frequency number.

In GSM, UTRAN and E-UTRAN the channel numbers are called Absolute Radio Frequency Channel Number (AR-FCN), UTRA Absolute Radio Frequency Channel Number (UARFCN) and E-UTRA Absolute Radio Frequency Channel Number (EARFCN) respectively.

In FDD systems separate channel numbers are specified for UL and DL. In TDD there is only one channel number since the same frequency is used in both directions.

The channel numbers (e.g. EARFCN) for each band are unique to distinguish between different bands. The channel number for each band can be derived from the expressions and mapping tables defined in the relevant specifications, such as 3GPP TS 25.101, "User Equipment (UE) radio transmission and reception (FDD)", 3GPP TS 25.104, "Base station (BS) radio transmission and reception (FDD)", 3GPP TS 36.101, "Evolved Universal Terrestrial Radio Access (E-UTRA) and Evolved Universal Terrestrial Radio Access (E-UTRAN); User Equipment (UE) radio transmission and reception", 3GPP TS 36.104, "Evolved Universal Terrestrial Radio Access (E-UTRA) and Evolved Universal Terrestrial Radio Access (E-UTRAN); Base station (BS) radio transmission and reception", 3GPP TS 05.05, "Radio Transmission and Reception". Based on the signaled channel numbers (e.g. EARFCN in E-UTRAN) and the pre-defined parameters associated with each band the UE can determine the actual carrier frequency in MHz and the corresponding frequency band. This is explained by the following example.

For example the relation between the EARFCN and the carrier frequency ($F_{DL}$) in MHz for the downlink is pre-defined by the following equation in:

$$F_{DL}=F_{DL\_low}+0.1(N_{DL}-N_{Offs-DL})$$

Reference is made to 3GPP TS 36.101, "Evolved Universal Terrestrial Radio Access (E-UTRA) and Evolved Universal Terrestrial Radio Access (E-UTRAN); User Equipment (UE) radio transmission and reception" and 3GPP TS 36.104, "Evolved Universal Terrestrial Radio Access (E-UTRA) and Evolved Universal Terrestrial Radio Access (E-UTRAN); Base station (BS) radio transmission and reception".

Where $F_{DL\_low}$ and $N_{Offs-DL}$ are pre-defined values for each band and $N_{DL}$ is the downlink EARFCN.

Consider E-UTRA band 5, whose EARFNC range ($N_{DL}$) as pre-defined in the specifications above lies between 2400-2649. The pre-defined values of $F_{DL\_low}$ and $N_{Offs-DL}$ are 869 and 2400 respectively. Assume the network signals downlink EARFCN to be 2500. Using the above expression the UE can determine that the downlink carrier frequency of the channel is 879 MHz. Furthermore, as stated above that the pre-defined EARFNC range being unique for each band, hence the UE can determine the frequency band corresponding to the signaled EARFNC. An expression to derive the E-UTRA FDD uplink carrier frequency, which is similar to that of the downlink carrier frequency, is also pre-defined. In E-UTRA FDD both fixed transmit-receive frequency separation (i.e. fixed duplex) and variable transmit-receive frequency separation (i.e. variable duplex) are supported. If fixed transmit-receive frequency separation is used by the network then the network does not have to signal the uplink EARFCN since the UE can determine the UL carrier frequency from the downlink carrier frequency and the pre-defined duplex gap. In an event the variable duplex is employed by the network for a certain band then both DL and UL EARFCN have to be signaled.

In the following, the use of channel number indication for mobility is explained.

In order to simplify the frequency search, or the so-called initial cell search, a center frequency of a radio channel is specified to be an integral multiple of a well defined, generally fixed, number, called channel raster. This enables UE to tune its local oscillator only at one of the raster points assuming it to be the center frequency of the channel being searched.

The channel raster in UTRAN FDD is 200 KHz but for certain channels and bands it is also 100 KHz. In E-UTRAN FDD and TDD, the channel raster for all channels and bands is 100 KHz. The channel raster directly impacts the channel numbering, which is described in the next section.

For the initial cell search or more specifically for the initial carrier frequency search the UE has to search at all possible raster frequencies e.g. with 100 KHz resolution in E-UTRAN frequency band. However for the UEs camped on or connected to the cell, the network signals the absolute radio frequency channel number(s) for performing measurements, mobility decisions such as cell reselection or commanding handover to certain cell belonging to certain frequency channel of the same or of different Radio Access Technology (RAT) etc.

Hence, the UE after camping on a cell in idle mode or when connected to a cell in connected mode can acquire the cell specific or UE specific system information, which contains information such as frequency band number (frequency band indicator), absolute radio frequency channel number(s) etc. More specifically in LTE the band number and the ARFCN (e.g. UL EARFNC in LTE) is signaled to the UE over the relevant system information blocks (SIB). For example in LTE the band number and the EARFCN of the cell are signaled to the UE over SIB1 and SIB2 respectively.

The SIB1 uses a fixed schedule with a periodicity of 80 ms and repetitions made within 80 ms. The first transmission of SIB1 is scheduled in sub-frame #5 of radio frames for which the SFN mod 8=0, and repetitions are scheduled in sub-frame #5 of all other radio frames for which SFN mod 2=0. The SIB1 also contains the scheduling information of the remaining SIBs e.g. SIB2, SIB3 etc. This means SIB2 scheduling information is determined by the UE by acquiring SIB1, which is transmitted with a periodicity of 80 ms. The contents of the SIB1 and SIB2 in LTE are known in the art.

The network can request the UE to perform handover to another frequency or another RAT in the frequency band, which can either be the same or different than the carrier frequency of the serving cell. Therefore, in order to assist the UE to perform the inter-frequency or inter-RAT handover the network signals the frequency channel number of the target carrier frequency in the handover command. For example for the UE in the connected mode the network the eNode B in LTE signals the SIB2 to the UE using the UE specific channel.

The standardization of a frequency band encompasses various aspects including the band numbering, raster, carrier frequency channel numbering, radio requirements for user equipments and base stations, performance requirements for user equipments and base stations, radio resource management (RRM) requirements etc. Some or all of these factors have to be taken into account by a manufacturer of for example user equipments and radio base stations. Examples of radio requirement for user equipments are requirement concerning out of band (OOB) emission, radio frequency (RF) exposure to human and more. As an example, performance requirements for user equipments and base stations may relate to mobility, e.g. mobility procedures, handover, cell reselection or the like.

The design and implementation of a duplexer becomes more difficult depending upon various factors. Notably, if a pass band is wide and if a duplex gap of the band is small, attenuation requirements in stop-band becomes large. The attenuation requirements relates to requirements for OOB, RF exposure and the like. The stop-band defines a frequency range in which reduced, or at least less than some threshold value, transmission from the transmitter is desired. As an example, an attenuation requirement may be a threshold level for OOB. In case of FDD 700 MHz, with full spectrum allocation, the pass band is very wide, i.e. 45 MHz in each direction, and the duplex gap is small. Presently, it is suggested that a user equipment configured for operation in such operating frequency band will use two duplexers. As a result, the attenuation requirements are believed to be fulfilled.

As mentioned above, a frequency band in the range of for example 700 MHz may have full spectrum allocation in certain regions, which herein are referred to as region A. On the other hand in some other regions, the spectrum allocation may be subset of the full band. Such regions are referred to as region B herein. Therefore, an issue is how to handle spectrum allocation in different regions.

To address this issue a first known solution is to define one frequency band based on the largest allocation. This approach simplifies mobility, such as roaming, and ensures the economy of scale, i.e. there is no need for devices designed, or configured, for specific regions. However, due to large allocation in full band, e.g. FDD UL/DL: 2×45 MHz with 10 MHz duplex gap, the user equipment will require two duplex filters to cover the entire band as mentioned above. This will increase the cost for user equipments in regions where it would be sufficient to have single duplexer in the user equipment due to partial allocation of the band. That is, cost of user equipments operating in region B will be unnecessarily high.

Therefore, in order to reduce cost of the user equipment operating mainly in region B, two bands are defined according to a second known solution. A first band band_X covers the entire frequency range, or the full spectrum, and a second band band_Y covers a subset of the full spectrum. Advantageously, cost of user equipments configured for region B may be kept lower since only one duplexer is needed. FIG. 3 shows a further block diagram illustrating another exemplifying frequency arrangement for the first band band_X, applied in region A, and the second band band_Y, applied in region B. In this general example, the first band band_X is an allocation to the full spectrum, or full band, and the second band band_Y is a partial allocation of the full spectrum. In this manner, multiple bands for overlapping frequency regions, or ranges, are defined.

A disadvantage of the second known solution is that a user equipment, supporting only a portion of the band, is not able to operate in a region where the entire band is allocated. Expressed differently, roaming of devices, such as the user equipment, between different regions is hampered.

SUMMARY

An object is to provide an alternative solution for reducing cost of user equipments operating in regions, where the spectrum allocation is a subset of the full band.

According to an aspect, the object is achieved by a method in a user equipment for assisting a first radio network node in selection of one or more mobility parameters. The user equipment is served by the first radio network node on a first operating frequency band. The user equipment sends, to the first radio network node, an indication of a second part of the first operating frequency band. The second part is supported by the user equipment. In this manner, the user equipment assists the first radio network node in said selection of said one or more mobility parameters. Said selection is based on said indication of the second part of the first operating frequency band. Next, the user equipment receives one or more mobility parameters from the first radio network node. Then, the user equipment applies said one or more mobility parameters.

According to another aspect, the object is achieved by a user equipment for assisting a first radio network node in selection of one or more mobility parameters. The user equipment is configured to be served by the first radio network node on a first operating frequency band. The user equipment comprises a transmitter configured to send, to the first radio network node, an indication of a second part of the first operating frequency band. The second part is supported by the user equipment. In this manner, the user equipment assists the first radio network node in said selection of said one or more mobility parameters. Said selection is based on said indication of the second part of the first operating frequency band. Furthermore, the user equipment comprises a receiver configured to receive one or more mobility parameters from the first radio network node. The user equipment further comprises a processing circuit configured to apply said one or more mobility parameters.

According to a further aspect, the object is achieved by a method in a first radio network node for selecting one or more mobility parameters. The first radio network node serves a user equipment on a first operating frequency band and said one or more mobility parameters is to be used by the user equipment. The first radio network node receives, from the user equipment, an indication of a second part of the first operating frequency band. The second part is supported by the user equipment. Next, the first radio network node selects one or more mobility parameters based on the received indication of the second part of the first operating frequency band. Then, the first radio network node sends the selected one or more mobility parameters to the user equipment.

According to a still further aspect, the object is achieved by a first radio network node for selecting one or more mobility parameters. The first radio network node is configured to serve a user equipment on a first operating frequency band and said one or more mobility parameters is to be used by the user equipment. The first radio network node comprises a receiver configured to receive, from the user equipment, an indication of a second part of the first operating frequency band. The second part is supported by the user equipment. Furthermore, the first radio network node comprises a processing circuit configured to select one or more mobility parameters based on the received indication of the second part of the first operating frequency band.

The first radio network node further comprises a transmitter configured to send the selected one or more mobility parameters to the user equipment.

In some embodiments, the indication of the second part of the first operating frequency band further indicates at least one of one or more parameters associated with supported duplexer arrangement characteristics, a duplexer arrangement type of the user equipment, a number of duplex filters comprised in the user equipment, and a plurality of channel numbers supported by the user equipment for the second part of the first operating frequency band. As an example, the indication of the second part of the first operating frequency band indicates supported channel numbers to be used in mobility procedures. The supported channel number may be predefined, e.g. the duplexer arrangement type may be mapped to specific range of channel numbers according to a predefined table or the like.

In some embodiments, said one or more mobility parameters may be one or more of said supported channel numbers, such as absolute radio frequency channel numbers (ARFCN).

According to embodiments herein, the user equipment sends, to the first radio network node, an indication of a second part of the first operating frequency band. Next, the first radio network node selects one or more mobility parameters based on the received indication of the second part of the first operating frequency band. Then, the first radio network node sends and the user equipment receives the selected one or more mobility parameters. In this manner, the user equipment receives mobility parameters which are adapted to the user equipment's configuration in terms of which portion of the first operating frequency band is used by the user equipment for operation on the first operating frequency band. For example, the user equipment may be operated on the second part of the first operating frequency band. Thus, allowing the user equipment to be equipped with an adequate number of duplexers which are configured to support the second part of the first operating frequency band, i.e. cost of such user equipment is reduced. The cost is reduced compared to a user equipment which is configured to support the first operating frequency band, not only a part thereof. As a result, the above mentioned object is achieved.

Moreover, thanks to that the user equipment sends the indication of a second part of the first operating frequency band, the first radio network node is able to accurately select said one or more mobility parameters for the user equipment. For example, the first radio network node avoids sending, to the user equipment, mobility parameters that are not adapted to the configuration of the user equipment in terms of supported channel numbers. Thus, avoiding delay and/or failure of mobility procedures.

In a first example, in case an entirety of the first operating frequency band is used, e.g. in region A, said one or more mobility parameters are adapted to the indication of the second part of the first operating frequency band, e.g. the plurality of channel numbers supported by the user equipment. This means that the user equipment is configured for operation in region B. A certain plurality of channel numbers may correspond to a certain part of the first operating frequency band as given by for example a predefined table. According to prior art, i.e. the second known solution, the first radio network node would assume the user equipment to be configured for region A and hence provide one or more mobility parameters suitable for a user equipment supporting the entirety of the first operating frequency band. This may lead to failed or delayed mobility procedures. But according to this example, the first radio network node selects said one or more mobility parameters based on for example the number of channel number supported by the user equipment. Thus, the first radio network node is able to efficiently manage mobility of the user equipment while at the same cost of user equipments configured for operation in region B is reduced.

An advantage of a user equipment supporting dual front end filters, i.e. two duplexers, can operate in different regions, such as region A and B, which regions uses the same part of the spectrum but with different allocations.

Another advantage is that there is no need of defining a new band when some regions support only part of the band, or spectrum.

For a user equipment supporting part of the band, an advantage is that it does not have to implement as many duplexers as the user equipment supporting the full band. This reduces cost and complexity of the user equipment, supporting only a part of the band, by using fewer duplexers, e.g. one duplexer instead of two duplexers. Furthermore, power consumption of the user equipment may be reduced as a consequence of the use of fewer duplexers.

Other objects, advantages and novel features of the invention will become apparent from the following detailed description of the invention when considered in conjunction with the accompanying drawings and claims.

BRIEF DESCRIPTION OF THE DRAWINGS

The various aspects of embodiments disclosed herein, including particular features and advantages thereof, will be readily understood from the following detailed description and the accompanying drawings, in which.

Figure 1:
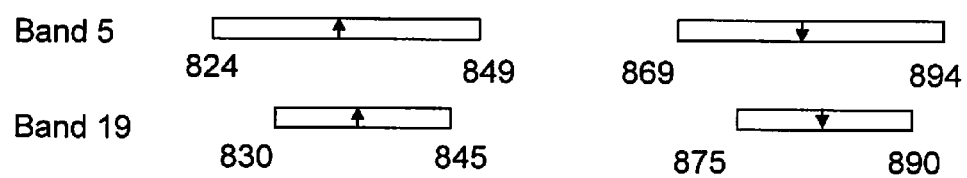
FIG. 1 shows a block diagram illustrating frequency arrangement for band 5 and band 19.
Figure 2:
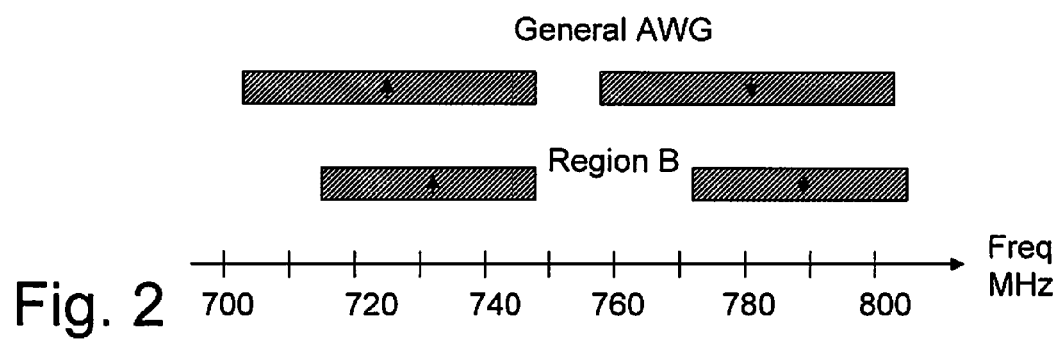
FIG. 2 shows another block diagram illustrating an exemplifying frequency arrangement for region A and region B.
Figure 3:
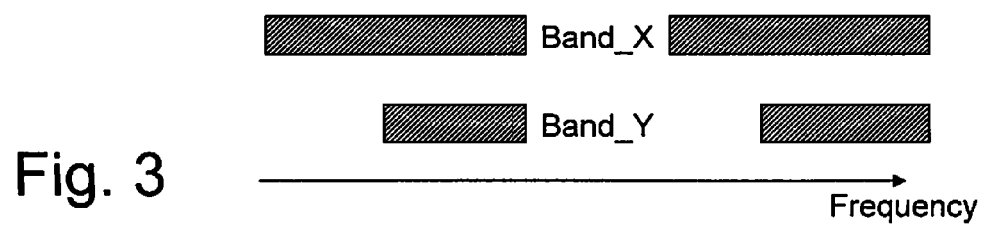
FIG. 3 shows a further block diagram illustrating another exemplifying frequency for a first band band_X and a second band band_Y.

Tables are also included in the present specification:

Table I provides an example of mapping between supported duplexers and emission control parameter for first band, Table II provides an example of mapping between the allowed additional maximum power reduction (A-MPR) and the emission control parameters: NS_10 and NS_11, Table III shows a generalized illustration of mapping between supported duplexers and emission control parameter for first band, and Table IV shows a generalized illustration of mapping between the allowed A-MPR and different emission control parameters: NS and RF exposure.

Table IV shows a generalized illustration of mapping between the supported duplexer arrangement characteristics and different mobility parameters, such as ARFCN.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary details.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

Moreover, throughout the following description similar reference numerals have been used to denote similar elements, network nodes, parts, items or features, when applicable. In the Figures, features that appear in some embodiments are indicated by dashed lines.

Figure 4:
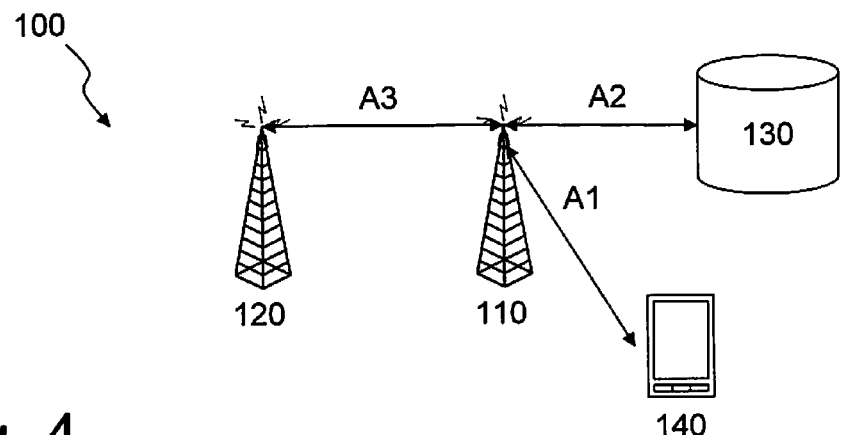
FIG. 4 shows a still further block diagram illustrating a first operating frequency band and a second part of the first operating frequency band.

FIG. 4 shows a schematic overview of an exemplifying radio communication system 100. The radio communication system 100 comprises a first radio network node 110, a second radio network node 120, a third network node 130 and a user equipment 140.

A first radio network node 110 hereinafter refers to the network node which serves the UE. Said first radio network node generally receives user equipment reports, e.g. UE capability information, and also signals the emission control parameter associated with a second network node to the UE. The emission control parameter may be associated with the second network node in that a RNC signals the emission control parameter associated with a NodeB, as example of the second network node. Example of first network nodes are, but not limited to, eNode B, base station, donor eNode B, relay node, BSC, RNC, positioning node, e.g. E-SMLC in Long Term Evolution (LTE) etc. The first node may belong to the same Radio Access Technology (RAT) as that of the second node or to a different RAT. Hence, the emission control parameter may also be signaled for Inter Radio Access Technology (IRAT) nodes i.e. for nodes with different RAT compared to the serving node. This is to account for IRAT cell reselection and handovers. For example, the serving node and the target nodes, i.e. second network nodes, can be both LTE eNode Bs. In another example the first node can be High Speed Packet Access (HSPA) Node B/RNC or GSM Base Transceiver Station/Base Station Controller (BTS/BSC) but the target node can be LTE eNode B. For example the serving node can be HSPA Node B/Radio Network Controller (RNC) or GSM BTS/BSC but the target node can be LTE eNode B.

A second radio network node 120 hereinafter refers to the network node for which at least one emission control parameter associated with the emission requirement is applicable. The network node, to which the emission requirement is applicable, is meant to explain that the parameter is specific to each cell served by the second radio network node 120. For example, two cells of the second radio network node 120 can be in region A and B respectively. Thus, the two cells will signal different parameters to the user equipment 140. In that sense, the parameters are radio node specific. That is why user equipment 140 needs to acquire the parameter from each radio node e.g. at HO. Said at least one emission control parameter is signaled by the first network node to the UE. In some other examples, the second network node may be the serving node, i.e. the second network node and the first radio network node 110 is the same node. In some further examples, the second network node may be a network node neighboring to the first radio network node 110. In the former case the second network node is the same as the first network node. Example of second nodes, not limited to, are eNode B, base station, donor eNode B serving relay, donor BS serving, relay node, one of the nodes in Coordinated Multi Point (CoMP) scenario etc.

A third network node 130, is a node which can acquire the information about the user equipment reports from the first network node. Examples of third node are Self Organizing Network (SON), Operation and Support System (OSS), Operation and Maintenance (O&M), network planning and management, Radio Network Controller (RNC), Base Station Controller (BSC), Node B, evolved-Node B (eNode B or eNB), positioning node, e.g. Evolved Serving Mobile Location Centre (E-SMLC). The third network node is capable of performing the task of network management, planning and optimization. In some cases the first node and third node may be the same node.

The term "user equipment", or UE, refers to any type of mobile terminal including mobile relay, target device, a mobile phone, a cellular phone, a Personal Digital Assistant (PDA) equipped with radio communication capabilities, a smart phone, a laptop equipped with an internal or external mobile broadband modem, a portable electronic radio communication device or the like.

One or more emission control parameters, which are signaled to the user equipment, indicate the value associated with any emission requirement which the user equipment is supposed to meet for the second node, such as the second radio network node 120. The examples of emission requirements are out of band emissions or more specifically 'additional spurious emission', RF exposure requirements etc. Typically, each emission control parameter may be associated with each emission requirement. Hence, more than one emission control parameters for the same second node may be signaled to the user equipment.

An arrow A1 indicates that the user equipment 140 and the first radio network node 110 are configured for communication with each other through a radio interface, such as Radio Resource Control (RRC) in LTE.

An arrow A2 indicates that the first radio network node 110 and the third network node 130 are configured for communication with each other through a communication interface, such as S1 in LTE.

An arrow A3 indicates that the first radio network node 110 and the second radio network node 120 are configured for communication with each other through a communication interface, such as X2 in LTE.

Figure 5:
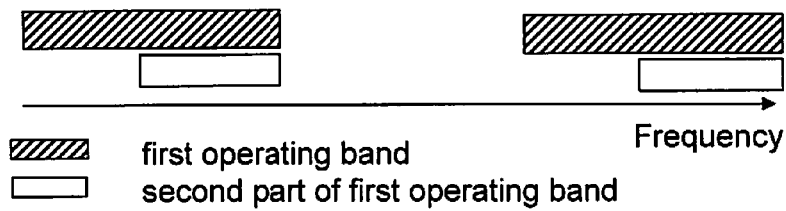
FIG. 5 shows yet another block diagram illustrating an operating frequency band supported by two user equipments.
Figure 6:
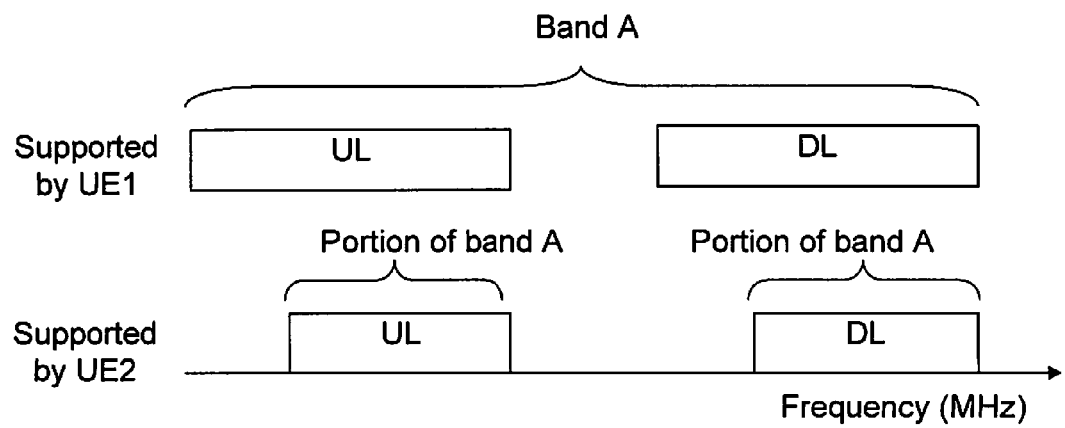
FIG. 6 shows a schematic overview of an exemplifying radio communication system in which exemplifying methods according embodiments herein may be implemented.

FIG. 5 and FIG. 6 illustrate exemplifying frequency arrangements in conjunction with which embodiments herein may be applied.

FIG. 5 shows another block diagram illustrating a first operating frequency band and a second part of the first operating frequency band. It shall here be noted that an operating frequency band is not defined for the second part of the first operating frequency band. Thereby, ensuring economy of scale and avoiding the need for user equipments configured for bands overlapping with another larger band.

The frequency arrangement, in which embodiments herein may be applied to, thus resemble the first known solution described in the background section. However, it may be noted that embodiments herein keep track of which part of the first frequency band is supported by the user equipment. As an example, the part may comprise the entire first frequency band or the second part of the first operating frequency band.

FIG. 6 shows yet another block diagram illustrating an operating frequency band supported by two user equipments. In this example, the two different user equipments support the same band, i.e. band A. Specifically, one of the user equipments UE1 supports the full band A, whereas the other user equipment UE2 supports a part of band A. Here, the part of band A is an example of the second part of the first operating frequency band.

Figure 7A:
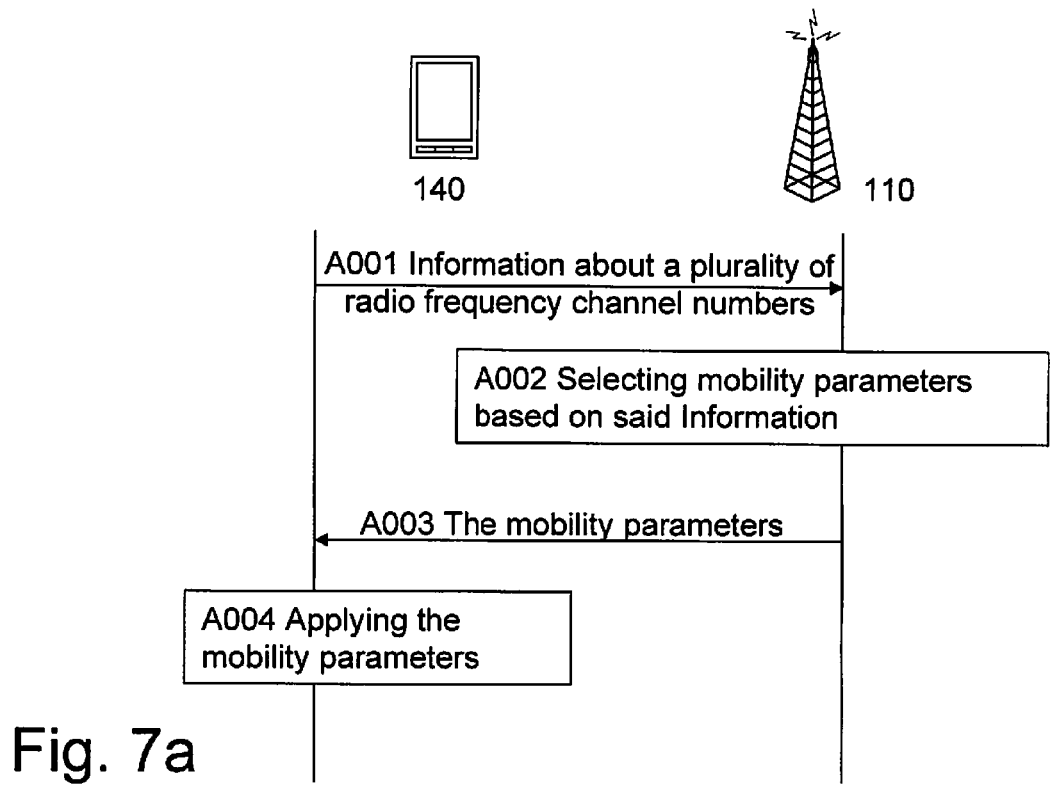
FIG. 7a shows a schematic, combined signaling and flow chart of a first non-limiting exemplifying method performed in the radio communication system according to FIG. 6.
Figure 7B:
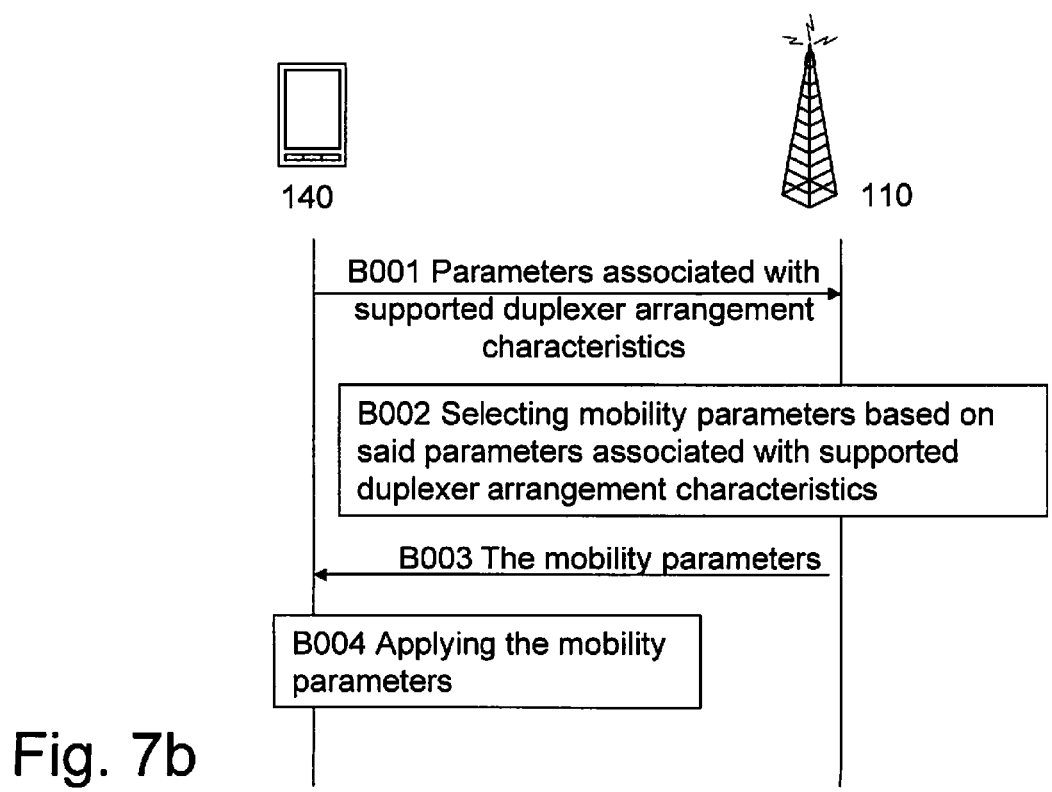
FIG. 7b shows a schematic, combined signaling and flow chart of a second non-limiting exemplifying method performed in the radio communication system according to FIG. 6.
Figure 7C:
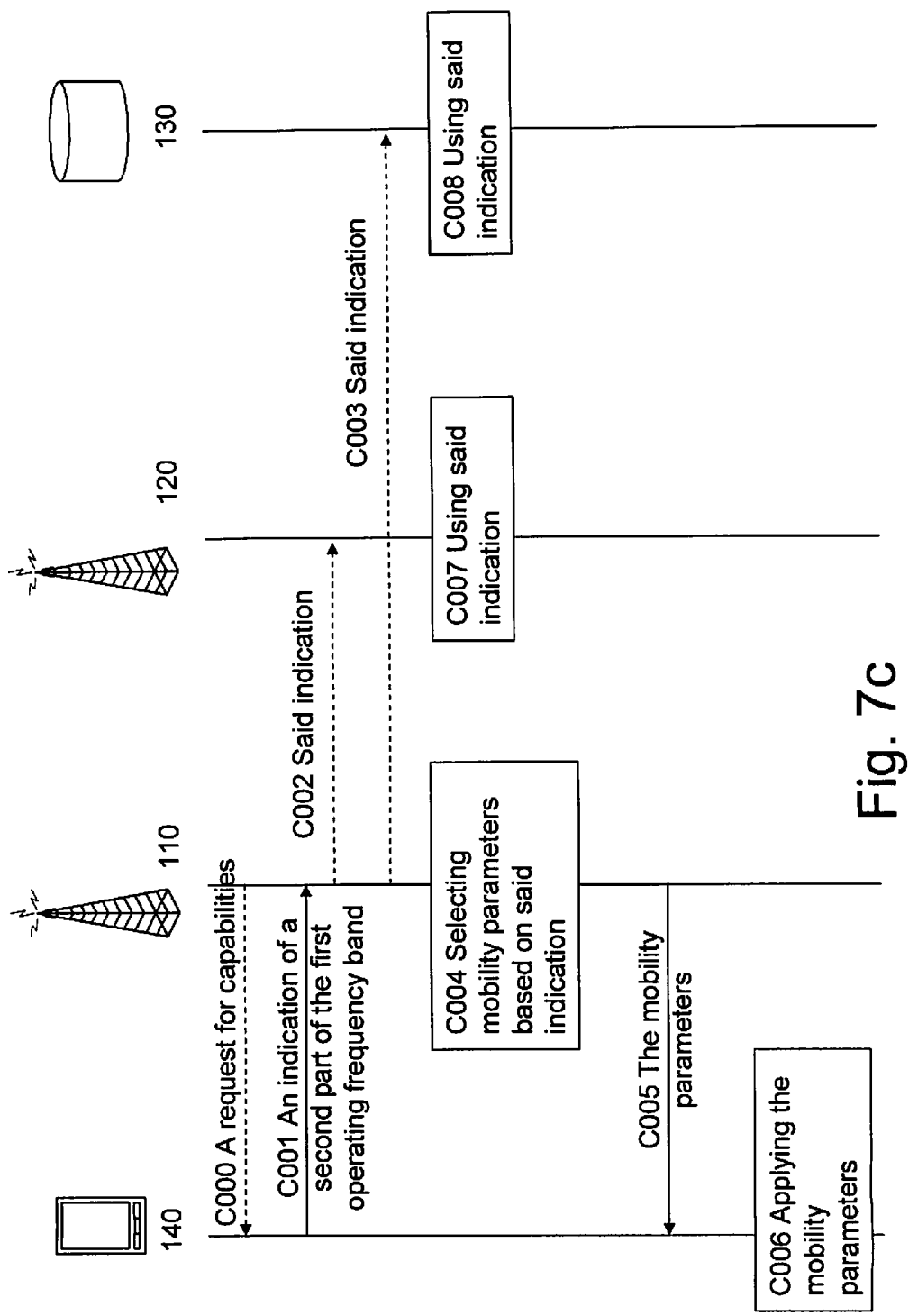
FIG. 7c shows a schematic, combined signaling and flow chart of exemplifying methods performed in the radio communication system according to FIG. 6.

FIG. 7a-7c show schematic combined signaling and flow charts of exemplifying methods performed in the radio communication system according to FIG. 5.

The terms duplexer, duplex filter, RF duplexer, RF duplex filter, duplex arrangement, duplexer arrangement are interchangeably used in literature. It is known to the person skilled in the art that all these terms refer to the same RF component. The duplexer enables simultaneous transmission and reception of signals on different carriers.

In a first non-limiting example with reference to FIG. 7a, the indication indicating the second part of the first operating frequency band comprises information associated with a plurality of radio frequency channel numbers supported by the user equipment for the second part of the first operating frequency band. As an example, the plurality of radio frequency channel numbers may be a plurality of ARFCNs or EARFCNs. In some examples, the indication is an array of radio frequency channel numbers supported by the user equipment for the second part of the first operating frequency band.

The following actions, such as steps, are performed.

Action A001

The user equipment 140 sends and the first radio network node 110 receives the information associated with the plurality of radio frequency channel numbers supported by the user equipment for the second part of the first operating frequency band. It shall here be noted that the information associated with the plurality of radio frequency channel numbers depends how many duplexers the user equipment needs to activate when being served by the first radio network node 110 on the second part of the first operating frequency band. As an example, when the first radio network node 110 is located in region B, it may suffice to activate merely one duplexer. As mentioned above, region B corresponds to a region where only a part of the first operating frequency band is used.

Action A002

The first radio network node 110 selects one or more mobility parameters based on the received information associated with said plurality of radio frequency channel numbers supported by the user equipment for the second part of the first operating frequency band. As an example, the first radio network node 110 uses a table to obtain one or more mobility parameters as given by the information associated with said plurality of radio frequency channel numbers. The table may be predefined or dynamically provided to the first radio network node 110.

As an example, said one or more mobility parameters comprises a subset of said plurality of radio frequency channel numbers. For example, radio frequency channel numbers that do not comprise any available radio resources and/or that do have poor channel quality may be excluded.

Action A003

The first radio network node 110 sends and the user equipment 140 receives and said one or more mobility parameters.

Action A004

The user equipment 140 applies said one or more mobility parameters.

Since the user equipment 140 is configured to support transmission on the second part of the first operating frequency band, the method above allows the user equipment 140 to be manufactured with a smaller number of duplexers as compared to a user equipment supporting the entire first operating frequency band. Thus, cost of the user equipment is decreased while at the same time mobility of the user equipment may be controlled by the first radio network node 110 in an efficient manner.

In a second non-limiting example with reference to FIG. 7b, said indication indicating the second part of the first operating frequency band indicates one or more parameters associated with supported duplexer arrangement characteristics. The indication may, in the second non-limiting example, be referred to as the indication about supported duplexer arrangement characteristics. For example, the indication about supported duplexer arrangement characteristics may depend on the second part of the first operating frequency band, i.e. which range in terms of frequency is covered by the second part.

In this example, actions B001, B003 and B004 remain essentially the same as actions A001, A003 and A004 in FIG. 7a. However, in these actions B001, B003 and B004, it needs to be taken into account that said indication indicating the second part of the first operating frequency band is exemplified by the indication about supported duplexer arrangement characteristics instead being exemplified by the information associated with the plurality of radio frequency channel numbers as in the first non-limiting example.

The following actions are performed.

Action B001

The user equipment 140 sends and the first radio network node 110 receives the indication about supported duplexer arrangement characteristics for the second part of the first operating frequency band. It shall here be noted that the indication about supported duplexer arrangement characteristics depends on how many duplexers the user equipment needs to activate when being served by the first radio network node 110 on the second part of the first operating frequency band. As an example, when the first radio network node 110 is located in region B, it may suffice to activate merely one duplexer. As mentioned above, region B corresponds to a region where only a part of the first operating frequency band is used.

Action B002

The first radio network node 110 selects one or more mobility parameters based on the received indication about supported duplexer arrangement characteristics. As an example, the first radio network node 110 uses a table, such as Table V, to obtain one or more mobility parameters for the supported duplexer arrangement characteristics. The supported duplexer arrangement characteristics is given by the indication about supported duplexer arrangement characteristics. The table may be predefined or dynamically provided to the first radio network node 110.

Embodiments, according to which the first radio network node 110 obtains information about supported duplex arrangement characteristics, number of duplexers, duplexer arrangement type or the like, may be particularly beneficial, since the first radio network node 110 may use this information to control radio emission from the user equipment. As an example, the transmission power, or transmission power level, of the user equipment may be adjusted. Known methods like maximum power reduction (MPR), A-MPR or similar may be used to control radio emission.

Thus, in some embodiments, the first radio network node 110 selects one or more emission control parameters based on the indication about supported duplexer arrangement characteristics, number of duplexers, duplexer arrangement type or the like.

In connection with these embodiments, which allows for improved radio emission control, it is also predicted that a problem as explained in the following may occur in the future. The current state of the art duplexer technology is not adequate to implement the full AWG 700 band using a single duplexer. However, it is expected that improvements in materials and design will allow for a single duplexer design in near future. Furthermore, in certain countries the allocation of the frequency band may be smaller, i.e. subset of full AWG 700 MHz band. For a smaller allocation, it may be sufficient to have single duplexer. For the first terminals supporting the full band, it is likely that a design utilizing two separate duplexers will be used. In this case, each duplexer will cover a part of the frequency band.

Thus, there may in the future exist user equipments configured for region A with one duplexer or with two duplexers. This may cause ambiguity in the network and may also lead to inadequate radio emission performance unless special actions are taken by the network. Hence, a further disadvantage of the first and second known solutions has been identified.

Hence, an advantage of these embodiments is that the first radio network node is able to accurately control radio emission from the user equipment by selecting one or more radio emission parameters based on the information about supported duplex arrangement characteristics, number of duplexers, duplexer arrangement type or the like. Notably, this advantage applies regardless of where, i.e. in what region, such as region A or B, the user equipment is operated. For example, the supported duplexer arrangement characteristics may be indicative of restrictions for OOB, RF exposure and/or the like.

Action B003

The first radio network node 110 sends and the user equipment 140 receives the said one or more mobility parameters.

Action B004

The user equipment 140 applies said one or more mobility parameters.

Since the user equipment 140 is configured to support transmission on the second part of the first operating frequency band, the method above allows the user equipment 140 to be manufactured with a smaller number of duplexers as compared to a user equipment supporting the entire first operating frequency band. Thus, cost of the user equipment is decreased while at the same time mobility of the user equipment may be controlled by the first radio network node 110 in an efficient manner.

Now turning to FIG. 7c, further exemplifying embodiments will be described. The user equipment 140 performs a method for assisting the first radio network node 110 in selection of one or more mobility parameters.

The first radio network node 110 performs a method for selecting one or more mobility parameters. The first radio network node 110 serves the user equipment 140 on the second part of the first operating frequency band. Said one or more mobility parameters is to be used by the user equipment 140.

In some embodiments, said indication of the second part of the first operating frequency band further indicates at least one of one or more parameters associated with supported duplexer arrangement characteristics, a duplexer arrangement type of the user equipment 140, a number of duplex filters comprised in the user equipment 140, and a plurality of channel numbers supported by the user equipment for the first operating frequency band.

In some embodiments, a predefined frequency range corresponds to the number of duplex filters and/or the duplexer arrangement type.

In some embodiments, a predefined number of duplex filters and/or a predefined duplexer arrangement type corresponds to the plurality of channel numbers.

In some embodiments, when said indication of the second part of the first operating frequency band further indicates the plurality of channel numbers, the plurality of channel numbers is expressed as a frequency range expressed in absolute radio frequency channel numbers or frequency values in Hz.

In some embodiments of the method, the frequency range is defined by at least one of a starting radio frequency channel number for the uplink and/or downlink, an ending radio frequency channel number for the uplink and/or downlink, and a width expressed in radio frequency channel numbers supported by the user equipment 140. As an example, the range may be defined by the starting radio frequency channel number and the ending radio frequency channel number for the uplink and downlink. Thus, in fact two ranges are defined; one range for the uplink and one range for the downlink. In another example, the range may be defined by the starting radio frequency channel number and the width or the ending radio frequency channel number and the width.

The following actions may be performed. Notably, in some embodiments of the method the order of the actions may differ from what is indicated below.

Action C000

In some embodiments, the first radio network node 110 sends and the user equipment 140 receives a request for capabilities of the user equipment 140. The capabilities of the user equipment (140), to be sent to the first radio network node 110 in response to the request, may comprise said indication of the second part of the first operating frequency band. It should be noted that the capabilities of the user equipment may include further information such as specified by 3GPP specifications. As an example, the request may be an enquiry about user equipment capabilities, referred to as UECapabilityEnquiry in TS 36.331. The purpose of this procedure is to transfer UE radio access capability information from the UE to E-UTRAN.

Action C001

This action corresponds to action A001 and/or B001.

The user equipment 140 sends and the first radio network node 110 receives the indication of the second part of the first operating frequency band. The second part is supported by the user equipment 140. In this manner, the user equipment assists the first radio network node 110 in said selection of said one or more mobility parameters. Said selection is based on said indication of the second part of the first operating frequency band, as will be explain in action C004.

Action C002

In some embodiments, the first radio network node 110 sends, to a second radio network node 120, the indication of the second part of the first operating frequency band. As an example the second radio network node 120 may be an eNB.

Action C003

In some embodiments, the first radio network node 110 sends, to a third network node 130, the indication of the second part of the first operating frequency band. The third network node 130 may be handling SON. Additionally or alternatively, the third node 130 may be an OSS or the like. In this manner, the third network node 130 is able to perform cell planning etc based on said indication.

In some embodiments, the received indication of the second part of the first operating frequency band is used for one or more radio network management tasks.

In some embodiments, said one or more radio network management tasks comprise at least one of network planning, network dimensioning, radio resource management, and setting of one or more mobility parameters.

Action C004

This action corresponds to action A002 and/or B002.

The first radio network node 110 selects one or more mobility parameters based on the received indication of the second part of the first operating frequency band.

In some embodiments, the selecting of said mobility parameters is performed by setting the mobility parameter to indicate one or more channel numbers supported by the user equipment as given by the indication of the second part of the first operating frequency band.

Action C005

This action corresponds to action A003 and/or B003.

The first radio network node 110 sends the selected one or more mobility parameters to the user equipment 140.

In some embodiments of the method, said one or more mobility parameters is used by the user equipment 140 for performing a mobility procedure or a measurement procedure.

Action C006

This action corresponds to action A004 and/or B004.

The user equipment 140 applies said one or more mobility parameters.

In some embodiments of the method, the applying is performed by applying said one or more mobility parameters for performing a mobility procedure or a measurement procedure.

In some embodiments, the mobility procedure comprises one or more of: a cell change, a cell reselection, an RRC redirection upon connection release, and an RRC re-establishment.

In some embodiments, the measurement procedure is at least one of: a CPICH measurement, a RSRP/RSRQ measurement, a cell identification measurement, a reading of system information, a positioning measurement, and a measurement for minimizing drive test MDT.

In some embodiments, the positioning measurement includes one or more of: a reference signal time difference RSTD measurement on positioning reference signals PRS in OTDOA, a UE Rx-Tx time difference measurement, and a RSRP/RSRQ measurement.

In some embodiments, the measurement for MDT includes one or more of: a BLER measurement of PDCCH and/or a paging channel, and a signal strength and/or signal quality measurement over certain time.

In some embodiments, said one or more mobility parameters indicates channel numbers in a handover command.

Action C007

In some embodiments, when action C003 is performed, the second radio network node 120 uses said one or more parameters associated with said supported duplexer arrangement characteristics of the user equipment 140 for the first operating frequency band. In this embodiment, the second radio network node 120 may select, similarly to the manner in which the first radio network node 110 selects, one or more mobility parameters based on said indication of the second part of the first operating frequency band.

In some embodiments, the second radio network node 120 receives said one or more selected mobility parameters, e.g. a mobility parameter, from the first radio network node 110. The mobility parameter may also be associated with the maximum number of allowed uplink channels, e.g. resource blocks, in addition to the UE maximum power reduction level. This because said one or more selected mobility parameters typically depends on band allocation, such as full or partial operating frequency band allocation, which in turn may imply a certain supported duplexer arrangement and thus certain radio emission characteristics. For example, the UL resource blocks may be limited to 50 RBs, as given by said one or more selected mobility parameter, though the channel bandwidth is 20 MHz. Hence, the second network node may adapt the scheduling grants for uplink transmissions according to the maximum allowed uplink channels, e.g. resource blocks, associated with the mobility parameter. In this way, the second network node, which performs the task of scheduling, uses said one or more selected mobility parameters.

Action C008

In some embodiments, when action C003 is performed, the third network node 130, or third node for short, uses the received information for network management tasks.

The acquired UE duplexer information, such as said indication indicating the second part of the first operating frequency band, can be used by the third node for different purposes such as for network management tasks such as for radio network or radio resource management, network/cell planning, network dimensioning (e.g. number of nodes supporting first band), assignment of channel numbering for the first band to the second nodes, BW allocation for first band to the second nodes depending upon the part of the first band commonly supported by most UEs.

The third node may also recommend channel numbers for mobility purposes. For instance based on acquired the statistics if it is observed that there are more UEs supporting certain range of channel numbers for first band due to the associated duplexer then it is more appropriate that network uses the relevant channel numbers in the network. This approach will improve mobility performance. For example, it is easier to perform handover in case a large number of second network nodes operate, i.e. neighboring network nodes, while using the channel numbers supported by most UEs in the network.

The third node may also provide the recommended information e.g. in terms of channel numbers for mobility to the first and second nodes, which in turn may use them for operation.

The embodiments herein are applicable to various scenarios including carrier aggregation (CA), CoMP etc. In case of CA the emission control parameter values and channel numbers for mobility can be derived by the first network node for each component carrier (CC).

Figure 8:
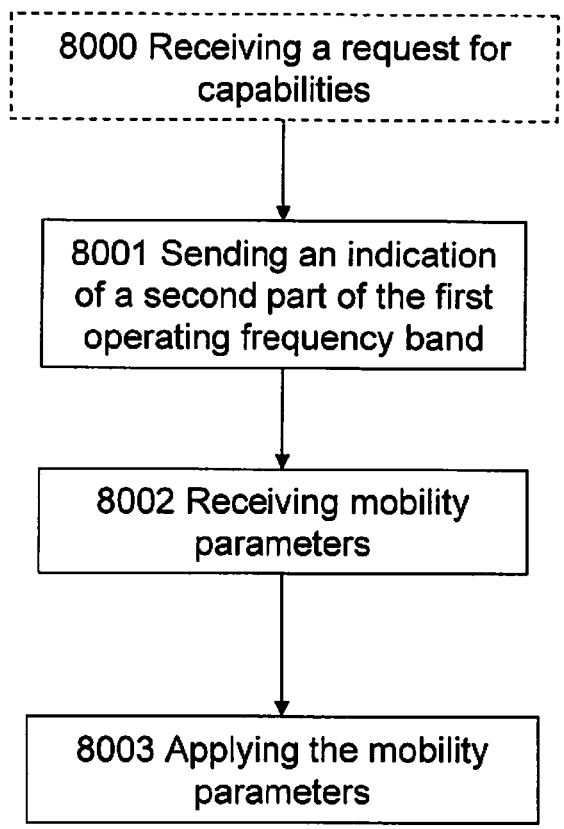
FIG. 8 shows a schematic flow chart of the methods of FIG. 7a-7c when seen from the user equipment.

In FIG. 8, an exemplifying, schematic flow chart of the methods of FIG. 7a-7c, when seen from the user equipment 140 is shown. The user equipment 140 performs a method for assisting the first radio network node 110 in selection of said one or more mobility parameters. As mentioned above, the user equipment 140 is served by the first radio network node 110 on the first operating frequency band. In some embodiments, the user equipment 140 is served by the first radio network node 110 only on the second part of the first operating frequency band.

The following actions may be performed. Notably, in some embodiments of the method the order of the actions may differ from what is indicated below.

Action 8000

This action corresponds to action C000.

In some embodiments, the user equipment 140 receives a request for capabilities of the user equipment 140 from the first radio network node 110. The capabilities of the user equipment 140 comprises said indication of the second part of the first operating frequency band.

Action 8001

This action corresponds to action C001.

The user equipment 140 sends said indication of the second part of the first operating frequency band to the first radio network node 110. The second part is supported by the user equipment 140. In this manner, the user equipment assists the first radio network node 110 in said selection of said one or more mobility parameters. As mentioned, said selection is based on said indication of the second part of the first operating frequency band.

Action 8002

This action corresponds to action C005.

The user equipment 140 receives one or more mobility parameters from the first radio network node 110.

Action 8003

This action corresponds to action C006.

The user equipment 140 applies said one or more mobility parameters.

In some embodiments of the method, the applying is performed by applying said one or more mobility parameters for performing a mobility procedure or a measurement procedure.

In some embodiments, the mobility procedure comprises one or more of: a cell change, a cell reselection, an RRC redirection upon connection release, and an RRC re-establishment.

In some embodiments, the measurement procedure is at least one of: a CPICH measurement, a RSRP/RSRQ measurement, a cell identification measurement, a reading of system information, a positioning measurement, and a measurement for minimizing drive test MDT.

In some embodiments, the positioning measurement includes one or more of: a reference signal time difference RSTD measurement on positioning reference signals PRS in OTDOA, a UE Rx-Tx time difference measurement, and a RSRP/RSRQ measurement.

In some embodiments, the measurement for MDT includes one or more of: a BLER measurement of PDCCH and/or a paging channel, and a signal strength and/or signal quality measurement over certain time.

In a further exemplifying embodiment, the user equipment 110 performs a method for signaling user equipment duplexer capability. As an example, said one or more parameters associated with supported duplexer arrangement characteristics provides information about the user equipment duplexer capability.

According to this embodiment the user equipment reports its capability in terms of supported duplex filter or duplexer characteristics for certain frequency band to its serving network node. The signaling can be done using any suitable protocols such as RRC, LPP etc.

Consider an example comprising of two types of user equipments, UE1 and UE2. Both types of user equipments support at least one common frequency band, e.g. band A. This means the supported band indicator or the so-called band number of the band supported by the two UEs is the same e.g. FDD band 30. The two UEs may also support additional bands. Furthermore, UE1 supports full band A whereas UE2 supports part of band A. The full band is very wide, e.g. 45 MHz in each direction, with small duplex, e.g. 10 MHz. With single duplexer the UE1 cannot sufficiently suppress the interference from the transmitter towards its own receiver when operating in certain part of the band. Therefore, UE1 which has to operate over the entire band will have to support more than one duplexer filter to ensure adequate reception performance of the received signal. Assume UE1 supports 2 duplex filters: D1 and D2 to cover the operation over the entire band. The UE1 uses D1 and D2 when UE operates over frequency ranges F1 and F2 respectively of band A. On the other hand the UE2 which supports part of band A (e.g. 35 MHz in each direction) and relatively larger duplexer gap (e.g. 20 MHz) compared to UE1, is able to operate with single duplexer or duplex filter, namely D3. The filter D3 can operate over frequency range F3 of band A. Such an example is shown in FIG. 6.

The above scenario where UEs bear different duplexer arrangement for the same band is explained by an example comprising of two types of UEs (UE1 and UE2) supporting two different duplexer arrangements. In practice depending upon the frequency band, there may be multiple types of UEs in terms of duplexer arrangement for the same frequency band e.g. UE1, UE2 and UE3 supporting tri-duplexer, dual duplexer and single duplexer respectively. Hence the above scenario can be generalized to multiple set of duplexers supported by different UEs for the same band. As different UEs support different duplexer arrangement in terms of number of duplexers and also their frequency range of operation, it is therefore advantageous that UEs report their duplexer arrangement characteristics or capability to their serving network node. The serving network node is termed as the first network node. The first network node can use this information for various purposes as described in the next sections.

The UE may report one or more parameter associated with or which depict its supported duplexer arrangement characteristics to the first network node. The examples of reported parameters are given below.

In a first example, the UE reports and indicates that it supports duplexer arrangement type 1 or duplexer arrangement type 2 and so on for a certain band e.g. band A which is hereinafter called first band for simplicity. In this case the duplexer arrangement types can be pre-determined. For example duplexers type 1 and type 2 can be pre-determined to correspond to dual duplexer and type 2 to single duplexer respectively for the first band. In another example a pre-determined rule can also contain additional information e.g. frequency range of operation of each duplexer. For example it can be pre-defined that in case if type 1, the duplex filters D1 and D2 operate over frequency range F1 and F2 respectively. Similarly it can be pre-defined that in case if type 2, the duplex filters D3 operates over frequency range F3. The frequency range can be expressed in terms of absolute channel numbers (e.g. EARFCN for LTE, UARFCN for HSPA etc) of first band or in terms of actual frequency (e.g. in MHz or GHz) within the first band.

In a second example, the UE reports the number of duplex filters it supports for the first band e.g. UE1 and UE2 report that they support 2 duplex filters and 1 duplex filter respectively. It may additionally be pre-defined the range of starting frequency range (e.g. in terms of channel number) for different duplexer arrangement as described in the first example above.

In a third example, the UE reports the information associated with the channel numbers (e.g. EARFCN for LTE, UARFCN for HSPA etc), which it supports for the first band. The reported channel number information, i.e. the information associated with the channel numbers, can be expressed in different manners. For example, the reported channel information may comprise of starting UL and/or DL channel numbers for the first band. The reported channel information may also comprise of end of UL and/or DL channel numbers for the first band and the total width of supported sub-band. The reported channel information may also include the range of UL and/or DL channel numbers for the first band. The mapping between the "information about the channel number supported by a UE" and the "number of duplex filters or particular duplexer arrangement" may also be pre-defined. The combination of the UE reported information and the pre-defined rule may implicitly indicate the number of supported duplex filters for the first band by certain UE.

In a fourth example, the UE may report any combination of information pertaining to its supported duplexer characteristics for first band to the first network node as described in previous examples. For instance, the UE may report the number of supported duplexers and also the information of the channel number (e.g. starting EARFNC) for each supported duplexer for the first band. For example UE2 reports that it supports single duplexer and the corresponding channel number information as described in third example.

Figure 9:
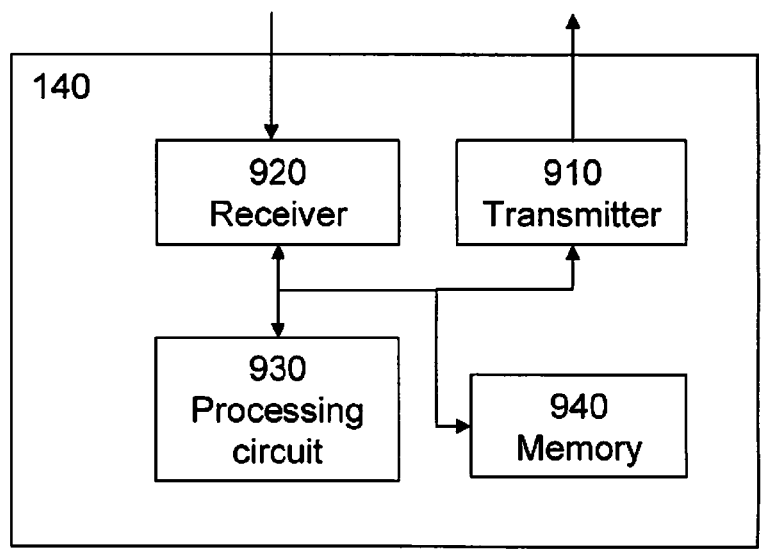
FIG. 9 shows a schematic block diagram of an exemplifying user equipment configured to perform the methods illustrated in FIG. 8.

With reference to FIG. 9, a schematic block diagram of the user equipment 140 is shown. The user equipment 140 is configured to perform the methods illustrated in FIG. 7a-7c, i.e. the user equipment 140 is configured to assist the first radio network node 110 in selection of one or more mobility parameters. As mentioned above, the user equipment 140 is configured to be served by the first radio network node (110) on the first operating frequency band.

In some embodiments of the user equipment 140, the user equipment 140 is configured to be served by the first radio network node 110 only on the second part of the first operating frequency band.

The user equipment 140 comprises a transmitter 910 configured to send, to the first radio network node 110, an indication of a second part of the first operating frequency band. The second part is supported by the user equipment 140. In this manner, the user equipment 140 assists the first radio network node in selection of one or more mobility parameters. As mentioned above, said selection by the first radio network node 110 is based on said indication of the second part of the first operating frequency band.

The user equipment 140 further comprises a receiver 920 configured to receive one or more mobility parameters from the first radio network node 110.

In some embodiments of the user equipment 140, the receiver 920 further is configured to receive, from the first radio network node 110, a request for capabilities of the user equipment 140. The capabilities of the user equipment 140 comprises said indication of the second part of the first operating frequency band.

Furthermore, the user equipment 140 comprises a processing circuit 930 configured to apply said one or more mobility parameters.

In some embodiments, the processing circuit 930 further is configured to apply said one or more mobility parameters for performing a mobility procedure or a measurement procedure.

In some embodiments, the mobility procedure is at least one of a handover, a cell change, a cell reselection, an RRC redirection upon connection release, and an RRC re-establishment.

In some embodiments, the measurement procedure is at least one of a CPICH measurement, a RSRP/RSRQ measurement, a cell identification measurement, a reading of system information, a positioning measurement, and a measurement for minimizing drive test MDT.

In some embodiments, the positioning measurement includes one or more of a reference signal time difference RSTD measurement on positioning reference signals PRS in OTDOA, a UE Rx-Tx time difference measurement, and a RSRP/RSRQ measurement.

In some embodiments of the user equipment 140, the measurement for MDT includes one or more of a BLER measurement of PDCCH and/or a paging channel, and a signal strength and/or signal quality measurement over certain time.

The processing circuit 930 may be a processing unit, a processor, an application specific integrated circuit (ASIC), a field-programmable gate array (FPGA) or the like. As an example, a processor, an ASIC, an FPGA or the like may comprise one or more processor kernels.

In some embodiments, the user equipment 140 may further comprise a memory 940 for storing software to be executed by, for example, the processing circuit. The software may comprise instructions to enable the processing circuit to perform the method in the user equipment 140 as described above in conjunction with FIG. 8. The memory 940 may be a hard disk, a magnetic storage medium, a portable computer diskette or disc, flash memory, random access memory (RAM) or the like. Furthermore, the memory may be an internal register memory of a processor.

Figure 10:
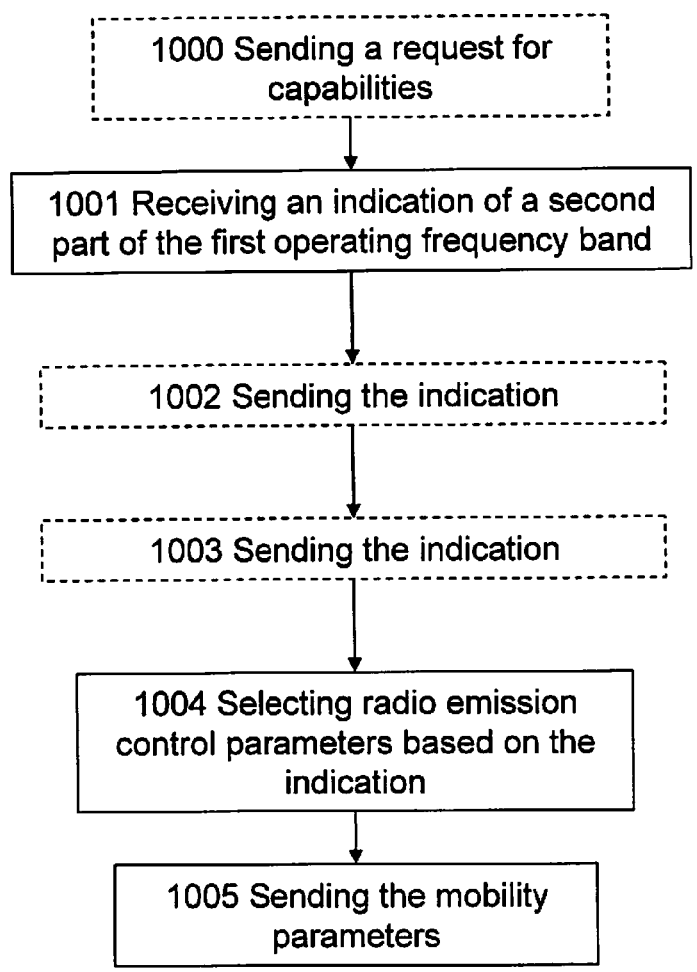
FIG. 10 shows a schematic flow chart of the methods of FIG. 7a-7c when seen from the first radio network node.

In FIG. 10, an exemplifying, schematic flow chart of the methods of FIG. 7a-7c, when seen from the first radio network node 110 is shown. The first radio network node 110 performs a method for selecting one or more mobility parameters. As mentioned above, the first radio network node 110 serves the user equipment 140 on the first operating frequency band. As mentioned above, said one or more mobility parameters is to be used by the user equipment 140.

In some embodiments, the first radio network node 110 serves the user equipment 140 only on the second part of the first operating frequency band.

The following actions may be performed. Notably, in some embodiments of the method the order of the actions may differ from what is indicated below.

Action 1000

This action corresponds to action C000.

In some embodiments. the first radio network node 110 sends, to the user equipment 140, a request for capabilities of the user equipment 140. The capabilities of the user equipment 140 comprises said indication of the second part of the first operating frequency band.

Action 1001

This action corresponds to action C001.

The first radio network node 110 receives said indication of a second part of the first operating frequency band from the user equipment 140. The second part is supported by the user equipment 140.

Action 1002

This action corresponds to action C002.

In some embodiments, the first radio network node 110 sends, to a second radio network node 120, the indication of the second part of the first operating frequency band. As an example the second radio network node 120 may be an eNB.

Action 1003

This action corresponds to action C003.

In some embodiments, the first radio network node 110 sends, to a third network node 130, the indication of the second part of the first operating frequency band. The third network node 130 may be handling SON. Additionally or alternatively, the third node 130 may be an OSS or the like.

In some embodiments, the received indication of the second part of the first operating frequency band is used for one or more radio network management tasks.

In some embodiments, said one or more radio network management tasks comprise at least one of network planning, network dimensioning, radio resource management, and setting of one or more mobility parameters.

Action 1004

This action corresponds to action C004.

The first radio network node 110 selects one or more mobility parameters based on the received indication of the second part of the first operating frequency band.

In some embodiments, the selecting of said mobility parameters is performed by setting the mobility parameter to indicate one or more channel numbers supported by the user equipment as given by the indication of the second part of the first operating frequency band.

Action 1005

This action corresponds to action C005.

The first radio network node 110 sends the selected one or more mobility parameters to the user equipment 140.

In some embodiments of the method, said one or more mobility parameters are used by the user equipment 140 for performing a mobility procedure or a measurement procedure.

In some embodiments, the mobility procedure comprises one or more of: a cell change, a cell reselection, an RRC redirection upon connection release, and an RRC re-establishment.

In some embodiments, the measurement procedure is at least one of: a CPICH measurement, a RSRP/RSRQ measurement, a cell identification measurement, a reading of system information, a positioning measurement, and a measurement for minimizing drive test MDT.

In some embodiments, the positioning measurement includes one or more of: a reference signal time difference RSTD measurement on positioning reference signals PRS in OTDOA, a UE Rx-Tx time difference measurement, and a RSRP/RSRQ measurement.

In some embodiments, the measurement for MDT includes one or more of: a BLER measurement of PDCCH and/or a paging channel, and a signal strength and/or signal quality measurement over certain time.

In some embodiments, said one or more mobility parameters indicates channel numbers in a handover command.

In a further example, the first radio network node selects one or more emission control parameters based on received UE capability.

As mentioned, the UEs may support different duplexer characteristics, e.g. dual or single duplexer, for the same band i.e. first band. The UE supporting duplexer filter type 1 and duplexer filter type 2 may also have different associated emission control parameter values. For example assume UE1 and UE2 support 2 and 1 duplexer for the first band respectively.

The example in table I shows that the required emission control parameter value, e.g. allowed A-MPR, for UE1 and UE2 depends upon the number of supported duplexers.

Table II also shows that in turn the required amount of UE max power reduction would depend upon the supported duplexers. These mappings between the required emission control value and duplexer types, such as type 1 and Type 2, as shown in table I and II can be pre-defined in the standard.

The required emission control value for each emission control parameter is associated with the second network node, e.g. a radio base station, relay. In LTE, the first and second network nodes are the one and same node, i.e. an eNodeB.

Upon receiving the duplexer arrangement characteristics information, the first network node shall select appropriate values of the emission control parameters. It shall be understood that the duplexer arrangement characteristics information refers to said one or more parameters associated with said supported duplexer arrangement characteristics. The selection of the parameter value can be based on the pre-defined mapping tables and UE reported duplexer capability. The selection of the parameter value can also be based on network implementation and the UE reported duplexer capability. After selecting the emission control parameter value, e.g. NS_10 for UE1, the first network node signals the parameter value to the UE. The network can signal the parameter to each UE individually, e.g. on UE specific channel such as Physical Downlink Shared Channel (PDSCH), or on a system information block (SIB) which is sent on a broadcast channel (BCH). In LTE, the BCH comprises of physical BCH (PBCH) and PDSCH without Hybrid Automatic Repeat reQuest (HARQ). The latter, i.e. PDSCH, carries one or more SIBs.

The UE upon receiving the emission control parameter value may apply the received parameter by reducing its maximum output power up to the indicated value e.g. by 2 dB.

The above tables can also be generalized for the case when there are UEs with multiple duplexers for the same band. The generalization principles are expressed in tables III and IV.

In some cases the signaling of emission control parameter value for certain parameter may not be possible. For example in HSPA, the NS_value is not signaled; but this is signaled in LTE. Similarly currently the RF exposure is not signaled in LTE or HSPA. Hence for such parameters which are not signaled, there can be a pre-defined rule. For example, it can be specified that UE shall apply certain level of maximum power reduction if it supports certain duplexer type, e.g. 3 dB power reduction for 2 duplexers and 1 dB for 1 duplexer.

In a further exemplifying method, the first radio network node 110 selects mobility parameters based on received UE capability.

As described earlier, the network node signals channel number, e.g. EARFCN in LTE, of the target carrier frequency to the UE for the purpose of mobility and associated measurements. Examples of mobility are handover, cell change, cell reselection, RRC redirection upon connection release etc. Furthermore the mobility scenario may comprise of intra-frequency, inter-frequency, inter-RAT etc.

The UEs with different number of duplexers may support different range of channel numbering for the first band. Hence, the first network node will use the indication of the second part of the operating frequency band, also referred to as UE reported capability information, and additional one or more set of pre-defined information to derive an appropriate value of the channel number for the first band for signaling to the UE for the purpose of mobility. The signaled channel number pertains to the second network node. This means the second network operates using this channel number associated with the first band. Here the second network node is the target radio base station e.g. first node is serving eNB and second node is the target eNB in LTE. For example for mobility purpose the first network node should signal only the relevant channel number to UE2. The relevant channel number is the one which falls within its supported frequency range in the first band and also supported by the second node, i.e. target eNB.

The derived channel number may also be used by the first node to request the UE to perform certain type of measurements prior to performing certain task e.g. HO. This means the derived channel number will be signaled to the UE for performing certain types of measurements, e.g. signal strength, for specific purpose, e.g. mobility, before executing that function, e.g. HO. The signaled channel number thus also pertains to the second network node, e.g. eNode B, base station in that the UE may be requested to perform certain types of measurements on signals transmitted by the second node, where these signals are sent on the signaled channel number. Examples of measurement types are mobility, SON, MDT, positioning etc.

The examples of measurements for mobility include CPICH measurements, RSRP, RSRQ, cell identification, system information reading, etc.

The examples of measurements for positioning include reference signal time difference (RSTD) measured on positioning reference signals (PRS) in OTDOA, UE Rx-Tx time difference measurements, RSRP, RSRQ, etc.

The examples of measurements for MDT are BLER of PDCCH, paging channel or any type of logged signal strength, signal quality over certain time etc.

In yet another exemplifying method, the first network node 110, or first radio network node 110, forwards the received UE capability information to the third network node 130 or the second radio network node 120. According to this embodiment the first network node forwards the received UE capability information in terms of supported duplexer arrangements, e.g. number of supported duplexers, associated frequency range etc, to the third network node or the second radio network node 120.

The first network node can signal the UE acquired capability information for each UE upon receiving or overall statistics periodically e.g. once in a day.

The first network node may also signal this information to the third network node when explicitly configured or requested by the third network node. The first network node may also signal this information to the third network node in response to a trigger e.g. when certain number of UEs supporting certain number of duplexer exceed a number over time period (T0). These triggering parameters can be pre-defined, configured by the third node or selected by the first node itself.

Figure 11:
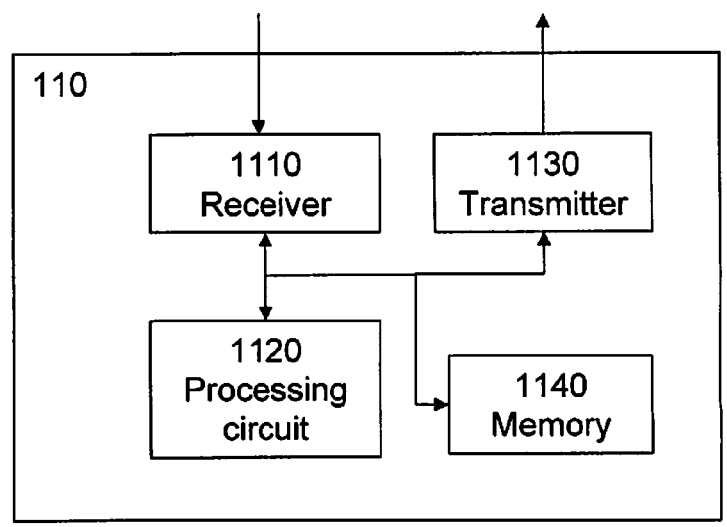
FIG. 11 shows a schematic block diagram of an exemplifying first radio network node configured to perform the methods illustrated in FIG. 10, FIG. 12-15 show schematic block diagrams of exemplifying user equipments and exemplifying network nodes.

With reference to FIG. 11, a schematic block diagram of the first radio network node 110 is shown. The first radio network node 110 is configured to perform the methods of FIG. 10, i.e. the first radio network node 110 is configured to select one or more mobility parameters. Moreover, the first radio network node 110 is configured to serve the user equipment 140 on the first operating frequency band. Said one or more mobility parameters is to be used by the user equipment 140.

In some embodiments, the first radio network node 110 is configured to serve the user equipment 140 only on the second part of the first operating frequency band.

The first radio network node 110 comprises a receiver 1110 configured to receive, from the user equipment 140, an indication of a second part of the first operating frequency band. The second part is supported by the user equipment 140.

The first radio network node 110 further comprises a processing circuit 1120 configured to select one or more mobility parameters based on the received indication of the second part of the first operating frequency band.

In some embodiments, the selecting of said mobility parameters is performed by setting the mobility parameter to indicate one or more channel numbers supported by the user equipment as given by the indication of the second part of the first operating frequency band.

Furthermore, the first radio network node 110 comprises a transmitter 1130 configured to send the selected one or more mobility parameters to the user equipment 140.

In some embodiments, the transmitter 1130 further is configured to send, to the user equipment 140, a request for capabilities of the user equipment 140. The capabilities of the user equipment 140 comprises said indication of the second part of the first operating frequency band.

In some embodiments, said one or more mobility parameters are to be used by the user equipment 140 for performing a mobility procedure or a measurement procedure.

In some embodiments, the mobility procedure comprises one or more of: a cell change, a cell reselection, an RRC redirection upon connection release, and an RRC re-establishment.

In some embodiments, the measurement procedure is at least one of: a CPICH measurement, a RSRP/RSRQ measurement, a cell identification measurement, a reading of system information, a positioning measurement, and a measurement for minimizing drive test MDT.

In some embodiments, the positioning measurement includes one or more of: a reference signal time difference RSTD measurement on positioning reference signals PRS in OTDOA, a UE Rx-Tx time difference measurement, and a RSRP/RSRQ measurement.

In some embodiments, the measurement for MDT includes one or more of: a BLER measurement of PDCCH and/or a paging channel, and a signal strength and/or signal quality measurement over certain time.

In some embodiments of the first radio network node 110, said one or more mobility parameters indicates channel numbers in a handover command.

In some embodiments of the first radio network node 110, the transmitter 1130 further is configured to send, to a second radio network node 120, the indication of the second part of the first operating frequency band.

In some embodiments of the first radio network node 110, the transmitter 1130 further is configured to send, to a third network node 130, the indication of the second part of the first operating frequency band.

In some embodiments of the first radio network node 110, said indication of the second part of the first operating frequency band is to be used by the third network node 130 for one or more radio network management tasks.

In some embodiments of the first radio network node 110, said one or more radio network management tasks comprise at least one of network planning, network dimensioning, radio resource management, and setting of one or more mobility parameters.

In some embodiments, the first radio network node 110 may further comprise a memory 1140 for storing software to be executed by, for example, the processing circuit. The software may comprise instructions to enable the processing circuit to perform the method in the first radio network node 110 as described above in conjunction with FIG. 10. The memory 1140 may be a hard disk, a magnetic storage medium, a portable computer diskette or disc, flash memory, random access memory (RAM) or the like. Furthermore, the memory may be an internal register memory of a processor.

Figure 12:
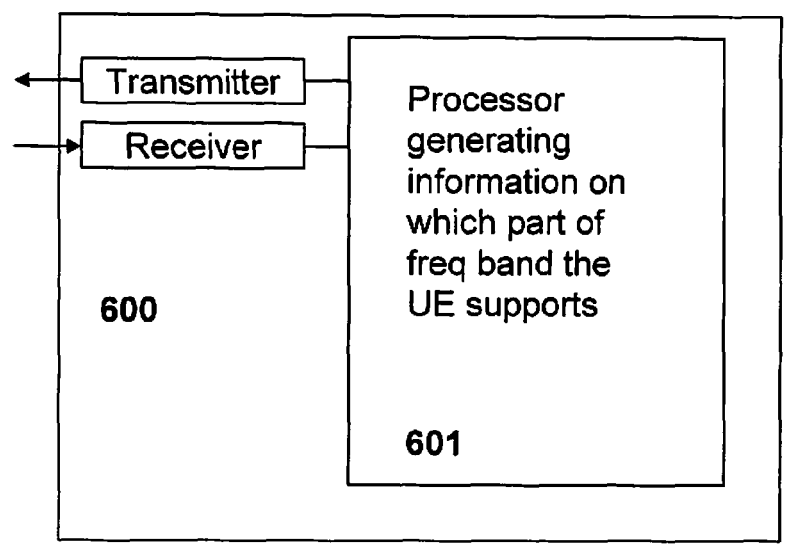

FIG. 12 illustrates schematically a user equipment 600, as a further example of the user equipment 140, comprising processing circuitry 601 configured to signal information to a network node, such as the first radio network node 110, indicating which part of a first operating frequency band the user equipment 140 supports.

Figure 13:
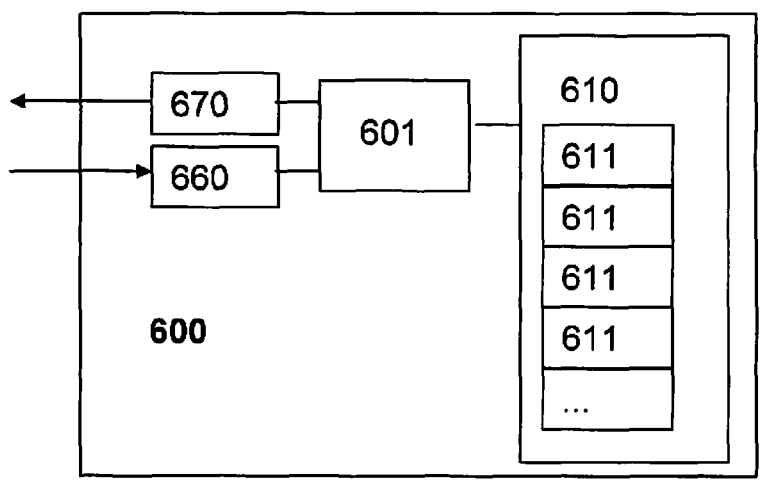

FIG. 13 illustrates schematically an embodiment of the user equipment 600, which also can be an alternative way of disclosing an embodiment of the user equipment 600 illustrated in FIG. 12. Comprised in the user equipment 600 are here a processor 601, e.g. with a DSP (Digital Signal Processor) and an encoding and a decoding module. The processor 601 can be a single unit or a plurality of unit to perform different steps of procedures described herein. The user equipment 600 also comprises an input unit 660, such as a receiver, and an output unit 670, such as a transmitter. The input unit 660 and the output unit 670 may be arranged as one in the hardware of the user equipment 600.

Furthermore, the user equipment 600 comprises at least one computer program product 610 in the form of a non-volatile memory, e.g. an EEPROM, a flash memory and a disk drive. The computer program product 610 comprises a computer program 611, which comprises code means, which when run on the processor 601 causes the processor 601 to perform the steps of the procedures described earlier.

Hence, in the exemplary embodiments described, the code means in the computer program 611 of the network node 600 comprises different modules 611. A module 611 essentially performs the method steps to emulate the device described in FIG. 12. In other words, when a module 611 is run on the processing unit 601, it corresponds to the previously described method steps that may be performed by the user equipment 600.

Figure 14:
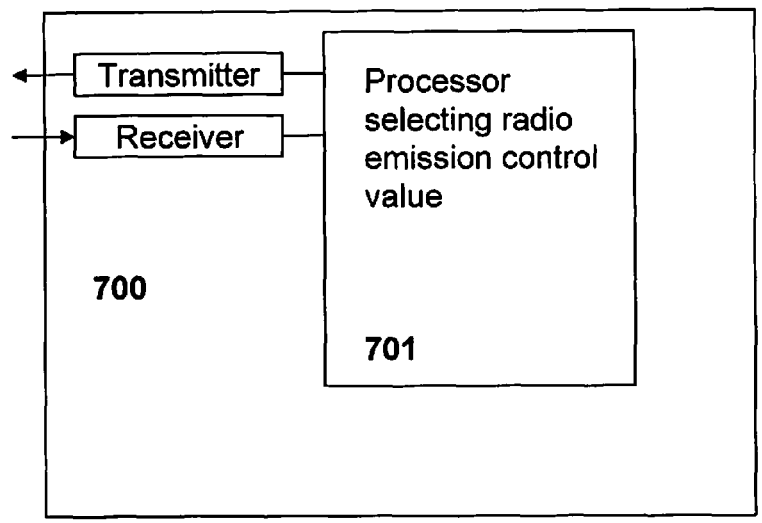

FIG. 14 illustrates schematically a network node 700, such as the first radio network node 110, comprising processing circuitry 701 configured to receive at least one parameter or an indicator or any information indicating a part of the first band supported by the user equipment, use the received information for selecting one or more radio emission control parameter value, and signal one or more selected radio emission control parameter associated with second network node to the user equipment for controlling the user equipment emission, or emission transmitted by the user equipment.

Figure 15:
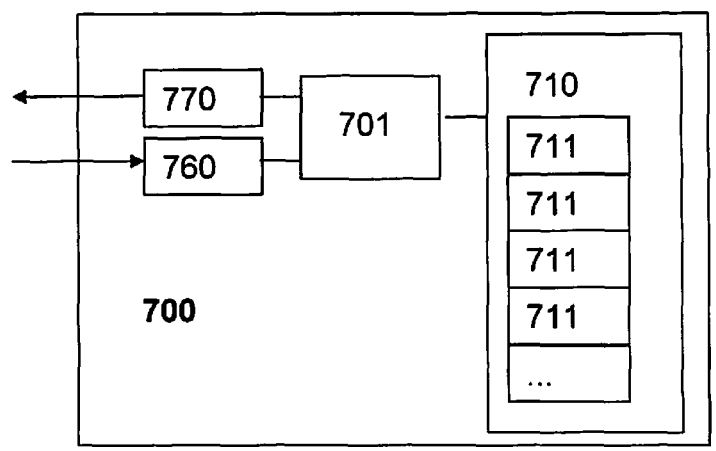

FIG. 15 illustrates schematically an embodiment of the network node 700, which also can be an alternative way of disclosing an embodiment of the network node 700 illustrated in FIG. 14. Comprised in the network node 700 are here a processor 701 e.g. with a DSP (Digital Signal Processor) and an encoding and a decoding module. The processor 701 can be a single unit or a plurality of unit to perform different steps of procedures described herein. The network node 700 also comprises an input unit 760, such as a receiver, and an output unit 770, such as a transmitter. The input unit 760 and the output unit 770 may be arranged as one in the hardware of the network node 700.

Furthermore, the network node 700 comprises at least one computer program product 710 in the form of a non-volatile memory, e.g. an EEPROM, a flash memory and a disk drive. The computer program product 710 comprises a computer program 711, which comprises code means, which when run on the processor 701 causes the processor 701 to perform the steps of the procedures described earlier.

Hence, in the exemplary embodiments described, the code means in the computer program 711 of the network node 700 comprises different modules 711. The modules 711 essentially perform the method steps to emulate the device described in FIG. 14. In other words, when the different modules 711 are run on the processing unit 701, they correspond to the previously described method steps that may be performed by the network node.

The teachings herein may, of course, be carried out in other ways than those specifically set forth herein without departing from essential characteristics of the present disclosure. The present embodiments are to be considered in all respects as illustrative and not restrictive.

In order to facilitate application of embodiments described herein to a scenario involving carrier aggregation, an overview of carrier aggregation is here provided.

To enhance peak-rates within a technology, multi-carrier or carrier aggregation solutions are known. For example, it is possible to use multiple 5 MHz carriers in HSPA to enhance the peak-rate within the HSPA network. Similarly in LTE for example multiple 20 MHz carriers can be aggregated in the UL and/or on DL. Each carrier in multi-carrier or carrier aggregation system is generally termed as a component carrier (CC) or sometimes is also referred to a cell. In simple words the component carrier (CC) means an individual carrier in a multi-carrier system. The term carrier aggregation (CA) is also called (e.g. interchangeably called) "multi-carrier system", "multi-cell operation", "multi-carrier operation", "multi-carrier" transmission and/or reception. This means the CA is used for transmission of signaling and data in the uplink and downlink directions. One of the CCs is the primary carrier or anchor carrier and the remaining ones are called secondary or supplementary carriers. Generally the primary or anchor CC carries the essential UE specific signaling. The primary CC exists in both uplink and direction CA. The network may assign different primary carriers to different UEs operating in the same sector or cell.

The CCs belonging to the CA may belong to the same frequency band (aka intra-band CA) or to different frequency band (inter-band CA) or any combination thereof (e.g. 2 CCs in band A and 1 CC in band B). The inter-band CA comprising of carriers distributed over two bands is also called as dual-band-dual-carrier-HSDPA (DB-DC-HSDPA) in HSPA or inter-band CA in LTE. Furthermore the CCs in intra-band CA may be adjacent or non-adjacent in frequency domain (aka intra-band non-adjacent CA). A hybrid CA comprising of intra-band adjacent, intra-band non-adjacent and inter-band is also possible. Using carrier aggregation between carriers of different technologies is also referred to as "multi-RAT carrier aggregation" or "multi-RAT-multi-carrier system" or simply "inter-RAT carrier aggregation". For example, the carriers from WCDMA and LTE may be aggregated. Another example is the aggregation of LTE and CDMA2000 carriers. For the sake of clarity the carrier aggregation within the same technology as described can be regarded as 'intra-RAT' or simply 'single RAT' carrier aggregation.

In the following, some additional information which may be helpful when implementing some embodiment presented herein is provided. For example, the information here provided may help when implementing embodiments where mobility performance is improved in addition to improving control of radio emission.

In the following a few known examples relating to handling of radio requirements, or radio emission requirements, are presented.

Although a wireless device typically operates in a well defined portion of the frequency band, emissions outside its operating or channel bandwidth and also outside its operating frequency band are unavoidable. These emissions outside the band width, or frequency band, are often termed as out of band emissions (OOB) or unwanted emissions. The emissions both inside and outside the band width and/or frequency band of operation are also exposed to human body.

These two concepts, i.e. OOB emission and RF exposure to human, and their associated signaling aspects are described below.

Firstly, out of Band (OOB) Emissions are described. The user equipments as well as base stations have to fulfill a specified set of out of band (OOB) and spurious emission requirements. The Out of band emissions are unwanted emissions immediately outside the assigned channel bandwidth resulting from the modulation process and non-linearity in the transmitter but excluding spurious emissions. Spurious emissions are emissions which are caused by unwanted transmitter effects such as harmonics emission, parasitic emissions, inter-modulation products and frequency conversion products, but exclude out of band emissions. The objective of OOB emission requirements is to limit the interference caused by the transmitters (UE or BS) outside their respective channel bandwidths to the adjacent carriers due to for example non-linearity and component imperfections. In fact, all wireless communication standards, such as GSM, UTRAN, E-UTRAN, Wireless Local Area Network (WLAN) etc, clearly specify the OOB emission requirements to limit or at least minimize the unwanted emissions. Reference is made to 3GPP TS 25.101, "User Equipment (UE) radio transmission and reception (FDD)", 3GPP TS 25.104, "Base station (BS) radio transmission and reception (FDD)", 3GPP TS 36.101, "Evolved Universal Terrestrial Radio Access (E-UTRA) and Evolved Universal Terrestrial Radio Access (E-UTRAN); User Equipment (UE) radio transmission and reception", 3GPP TS 36.104, "Evolved Universal Terrestrial Radio Access (E-UTRA) and Evolved Universal Terrestrial Radio Access (E-UTRAN); Base station (BS) radio transmission and reception" and 3GPP TS 05.05, "Radio Transmission and Reception". Spurious emissions requirements are defined in order to limit the emissions out of the operating band where the UE or BS is operating due to for example harmonic emissions and inter-modulation products. They are primarily approved and set by the national and international regulatory bodies, e.g. International Telecommunications Union Radiocommunication Sector (ITU-R), Federal Communications Commission (FCC), Association of Radio Industries and Business (ARIB), European Telecommunication Standard Institute (ETSI), etc.

Some major OOB and spurious emission requirements, which are typically specified by the standards bodies and eventually enforced by the regulators in different countries and regions for both UE and the base stations comprise:

Adjacent Channel Leakage Ratio (ACLR)
Spectrum Emission Mask (SEM)
Spurious emissions The specific definition and the specified level of these requirements can vary from one system to another. Typically these requirements ensure that the emission levels outside the transmitter channel bandwidth or operating band remain several tens of dB below the transmitted signal. Emission levels tend to decay dramatically further away from an operating band but they are not completely eliminated at least in the adjacent carrier frequencies.

In order to handle, or control, unwanted radio emission, or OOB, a concept of maximum power reduction (MPR) is used in many telecommunication systems.

As stated above, the user equipment and the base station have to meet the OOB and spurious emission requirements irrespective of their transmission power level. For the UE the conservation of its battery power is very critical. This requires that the UE has an efficient power amplifier (PA). The PA is therefore typically designed for certain typical operating points or configurations or set of parameter settings e.g. modulation type, number of active physical channels, e.g. resource blocks in E-UTRA or number of CDMA (Code Division Multiple Access) channelization codes code/spreading factor in UTRA. But in practice the user equipment may operate using any combination of modulation, physical channels etc. Therefore, in some UL transmission scenarios the UE power amplifier may not be able to operate in the linear zone, thereby causing unwanted emissions due to harmonics or other non-linear characteristics. To ensure that UE fulfils OOB/spurious requirements for all allowed UL transmission configurations the UE is allowed to reduce its maximum UL transmission power in some scenarios when it reaches its maximum power. This is called maximum power reduction or UE power back-off in some literature. For instance a UE with maximum transmit power of 24 dBm power class may reduce its maximum power from 24 dBm to 23 or 22 dBm depending upon the configuration.

The base station (BS) may also have to perform MPR but this is not standardized, Secondly the BS can afford to have a PA with larger operating range since its efficiency is less critical compared to that of UE. The reason is that an inefficient PA leads to increase in power consumption decreasing the battery life. The UE power consumption due to its limited battery life is more critical compared to that of the BS.

The MPR values for different configurations are generally well specified in the standard. The UE uses these values to apply MPR when the conditions for the corresponding configurations are fulfilled. These MPR values are regarded as static in a sense that they are independent of resource block allocation and other deployment aspects.

Another concept is the so called additional maximum power reduction (A-MPR). In E-UTRA an additional MPR (A-MPR) for the UE transmitter has also been specified in addition to the normal MPR. The difference is that the former is not fully static. Instead the A-MPR can vary between different cells, operating frequency bands and more specifically between cells deployed in different location areas or regions. In particular the A-MPR may be applied by the UE in order to meet the so-called additional spurious emission requirements imposed by the regional regulatory organization. The user equipment is not allowed to reduce its maximum output power beyond the A-MPR. Therefore it is often termed as 'allowed A-MPR'. However a typical user equipment implementation will apply the full allowed A-MPR in order to meet the additional radio emission requirements using RF power amplifier which leads to efficient utilization of its battery.

The A-MPR includes all the remaining UE maximum output power reduction, on top of the normal MPR, needed to account for factors such as: bandwidth, frequency band, resource block allocation, requirements set by regional regulatory bodies (FCC, ARIB, European regulation etc).

Furthermore, signaling of regulatory requirements and A-MPR to the UE is performed as follows. The regulatory requirements may vary from one region to another and from one network to another. The presence of additional regulatory requirements is signaled via a cell specific signaling known as network signaling (NS). Reference is made to 3GPP TS 36.101, "Evolved Universal Terrestrial Radio Access (E-UTRA) and Evolved Universal Terrestrial Radio Access (E-UTRAN); User Equipment (UE) radio transmission and reception". Associated with the NS signaling there is a set of A-MPR which may depend on for example resource block allocation.

To meet the regulatory emission requirements the A-MPR required could vary from one part of the network to another. This is due to the factors such as the variable bandwidth, varying number of resource block allocation, different bands in different parts of the networks etc. Even if the deployment scenario, in terms of bands used, bandwidth size etc., is homogeneous in a large coverage area, there will always be border regions between these coverage areas. Therefore A-MPR is a cell specific value.

Due to the above reasons the A-MPR is signaled to the UE via system information in a UE specific channel or in a broadcast message. This allows the UE to acquire this information when it camps on to a cell. The acquired A-MPR value which is associated with a cell is then used by the UE to reduce its maximum output power whenever it transmits in the uplink.

Secondly, the concept of handling, or controlling, RF Exposure to Human is described. Another important factor, apart from OOB, is the human exposure to radiofrequency (RF) electromagnetic fields (EMF), which are transmitted by the UE. The most important guidelines on RF exposure to human are from the International Commission on Non-Ionizing Radiation Protection (ICNIRP, 1998) and from the Institute of Electrical and Electronics Engineers (IEEE, 1999). The limits in these recommendations are similar and they have been used as the basis for national standards and regulations in many countries. The ICNIRP guidelines, which are the most widely used recommendations, have been endorsed by the World Health Organization (WHO).

These RF exposure guidelines are science-based and the prescribed limits have been set with substantial safety margins. They provide protection from all established health effects from short-term and long-term exposure to RF fields, and the safety of children and other segments of the population have been taken into account.

Specific Absorption Rate (SAR) is introduced to measure impact on the human body from the exposure of RF EMF transmitted by the UE. SAR is a measure of the maximum energy absorbed by a unit of mass of exposed tissue of a person using a mobile phone, over a given time or more simply the power absorbed per unit mass. Advised by ICNIRP, the communication administration departments of different countries issued the SAR limits. For instance, the Federal Communications Commission (FCC) has determined that the SAR limit is 1.6 W/kg for cell phone. The SAR limit in Europe and in most of countries is 2 W/kg.

A reduction of power limits RF exposure to human. Thus, the user equipment should comply with the SAR requirements or any type requirements for limiting the RF exposure to human which are specified by the regulator in an individual country, region, province or state etc. In order to meet these requirements the user equipment may also have to reduce its maximum output power. Hence, the user equipment maximum output power is limited by the SAR limit.

In prior art, a generic term called power management is also interchangeably used for controlling emissions to limit the SAR. The power management MPR (P-MPR) is the amount of UE power output power reduction to meet the RF exposure requirements.

Now, a known concept of signaling of RF Exposure Requirements to the user equipment is described. One or more parameters associated with the MPR to be applied by the user equipment to meet the SAR or any type of RF exposure requirements are signaled to the user equipment. This means the P-MPR may also be signaled to the user equipment. This is due to the fact that SAR or RF exposure requirements may vary from one region to another. Hence the amount of the MPR required by the user equipment to meet the requirements may vary from one cell to another.

When developing and designing a user equipment, an aspect that often is thoroughly considered is cost of the user equipment. Cost of the user equipment is for example dependent on number of duplexers, or duplex filters, comprised in the user equipment. A duplexer is used to connect a transmitter and a receiver to an antenna. The user equipment comprises the transmitter, the receiver and the antenna. The duplexer is designed to prevent interfering signals transmitted by the transmitter from reaching the receiver. Interference from the transmitter to the receiver is commonly referred to as transmitter noise. One source of transmitter noise is so called out of band emission (OOB), which more specifically may be called inter-modulation products. Thus, the duplexer should also be designed to substantially suppress transmitter noise.

According to further exemplifying embodiments, the following applies.

Embodiments herein comprises a set of rules that may be pre-determined and signaling means to ensure that a user equipment supporting at least a second part of the operating frequency band is able to operate in a region where second part of the first operating frequency band is allocated. The second part of the first operating frequency band is a subset of the first part of the first operating frequency band.

To accomplish the above objective a method in the user equipment supporting first operating band comprises according to an embodiment the step of signaling at least one parameter or an indicator or information to a first network node indicating which part of the first operating frequency band the user equipment supports, for example, whether the user equipment (UE) supports the first part or second part of the first operating frequency band.

Another aspect of an embodiment herein relates to an arrangement in a user equipment (UE) comprising processing circuits configured to signal at least one parameter or an indicator or information to a first network node indicating which part of the first operating frequency band the UE supports, for example, whether the UE supports the first part or second part of the first operating frequency band.

A method in a first network node comprises according to an embodiment the steps of:

receiving at least one parameter or an indicator or any information indicating a part of the first band supported by the UE.

using the received information for selecting one or more radio emission control parameter value.

signaling one or more selected radio emission control parameter associated with second network node to the UE for controlling the UE emission.

In a particular embodiment, the selection of the emission control parameter value by first network node can also be based on one or more pre-determined rules in addition to the received information from the UE.

The method in the first network node may in a particular embodiment further comprise the steps of:

using the received information for selecting the channel number of the first band, for example by selecting one or more parameters associated with the channel number of the first band.

signaling indication of the selected channel number to the UE for performing cell change e.g. HO, RRC re-establishment, RRC connection redirection upon connection release.

The method in the first network node may in a particular embodiment further comprise the step of:

signaling the received information to a third node, which may use this for one or more radio network management tasks e.g. network planning and dimensioning, radio resource management, setting of one or more mobility parameters etc.

Another aspect of an embodiment of the invention relates to an arrangement in a network node comprising processing circuits configured to receive at least one parameter or an indicator or any information indicating a part of the first band supported by a UE.

use the received information for selecting one or more radio emission control parameter value.

signal one or more selected radio emission control parameter associated with a second network node to the UE for controlling the UE emission.

In further embodiments, the processing circuit may be configured to:

use the received information for selecting the channel number of the first band, for example by selecting one or more parameters associated with the channel number of the first band, and/or signal indication of the selected channel number to the UE for performing cell change e.g. HO, RRC re-establishment, RRC connection redirection upon connection release.

In yet further embodiments, the processing circuit may be configured to signal the received information to a third node, which may use this for one or more radio network management tasks e.g. network planning and dimensioning, radio resource management, setting of one or more mobility parameters etc.

The information provided by said one or more parameters associated with supported duplexer arrangement characteristics and/or supported radio frequency channel numbers may be referred to as duplexer capability, or user equipment (UE) duplexer capability.

Aspects of embodiments of the present disclosure comprise:

a method in UE of signaling UE duplexer capability, a method in first network node of selecting UE emission control parameter based on received UE capability, a method in first network node of selecting mobility parameters based on received UE capability, a method in first network node of forwarding the UE received capability information to the second or a third node, and a method in third network node of using the received information for network management task.

Even though embodiments of the various aspects have been described, many different alterations, modifications and the like thereof will become apparent for those skilled in the art. The described embodiments are therefore not intended to limit the scope of the present disclosure.

Tables

TABLE I

Example of mapping between supported duplexers and emission control parameter for the first band.

| Emission control parameter | Supported number of duplexers | |
|---|---|---|
| | 2 duplexers | 1 duplexer |
| NS_value | 10 | 11 |

TABLE II

Example of mapping between the allowed A-MPR and the emission control parameters: NS_10 and NS_11.

| Emission control parameter | Allowed A-MPR (dB) |
|---|---|
| NS_10 | 3 |
| NS_11 | 1 |

TABLE III

Generalized illustration of mapping between supported duplexers and emission control parameter for first band.

| Emission control parameter | Supported number of duplexers | | |
|---|---|---|---|
| | N duplexers | N − 1 duplexers | 1 duplexer |
| NS_value | 10 | 11 | 12 |
| RF exposure | 1 | 2 | 3 |

TABLE IV

Generalized illustration of mapping between the allowed A-MPR and different emission control parameters: NS and RF exposure.

| Emission control parameter | Allowed A-MPR (dB) |
|---|---|
| NS_10 | 3 |
| NS_11 | 1 |
| RF_exposure_1 | 2 |

TABLE IV-continued

Generalized illustration of mapping between the allowed A-MPR and different emission control parameters: NS and RF exposure.

| Emission control parameter | Allowed A-MPR (dB) |
|---|---|
| RF_exposure_2 | 1 |
| RF_exposure_3 | 3 |

TABLE V

Generalized illustration of mapping between the supported duplexer arrangement characteristics and different mobility parameters, such as ARFCN. In this table, x and y represent radio frequency channel numbers defining a range of radio frequency numbers supported for the number of duplexers indicated in the left column of Table V.

| Supported duplexer arrangement characteristics | ARFCN |
|---|---|
| 2 duplexers | x to y |
| 1 duplexer | x minus 100 to y plus 100 |

The invention claimed is:

1. A method in a user equipment for assisting a first radio network node in the selection of one or more mobility parameters, wherein the user equipment is served by the first radio network node on a first operating frequency band, wherein the method comprises:
sending, to the first radio network node, an indication of a second part of the first operating frequency band, wherein the second part is supported by the user equipment, thereby assisting the first radio network node in said selection of said one or more mobility parameters, which selection is based on said indication of the second part of the first operating frequency band;
receiving one or more mobility parameters from the first radio network node; and
applying said one or more mobility parameters.

2. The method according to claim 1, wherein the user equipment is served by the first radio network node only on the second part of the first operating frequency band.

3. The method according to claim 1, wherein the method further comprises:
receiving from the first radio network node, a request for capabilities of the user equipment, and responding to said request by said sending said indication of the second part of the first operating frequency band.

4. The method according to claim 1, wherein said applying comprises applying said one or more mobility parameters for performing a mobility procedure or a measurement procedure.

5. The method according to claim 4 wherein the mobility procedure is at least one of: a handover, a cell change, a cell reselection, a Radio Resource Control (RRC) redirection upon connection release, and an RRC re-establishment.

6. The method according to claim 4, wherein the measurement procedure is at least one of: a Common Pilot Channel (CPICH) measurement, a Reference Signal Received Power, (RSRP) measurements, a Reference Signal Received Quality (RSRQ) measurement, a cell identification measurement, a reading of system information, a positioning measurement, and a measurement for minimizing drive test (MDT).

7. The method according to claim 6, wherein the positioning measurement includes one or more of: a Reference Signal Time Difference (RSTD) measurement on Positioning Reference Signals (PRS) in Observed Time Difference of Arrival (OTDOA), a user equipment receive-transmit (UE Rx-Tx) time difference measurement, and a Reference Signal Received Power (RSRP) measurement, and a Reference Signal Received Quality (RSRQ) measurement.

8. The method according to claim 6, wherein the measurement for MDT includes one or more of: a Block Error Rate (BLER) measurement of a Physical Downlink Control Channel (PDCCH); a BLER measurement of a paging channel; a signal strength measurement over certain time; and a signal quality measurement over a certain time.

9. The method according to claim 1, wherein said indication of the second part of the first operating frequency band further indicates at least one of:
one or more parameters associated with supported duplexer arrangement characteristics;
a duplexer arrangement type of the user equipment;
a number of duplex filters comprised in the user equipment; and
a plurality of channel numbers supported by the user equipment for the first operating frequency band.

10. The method according to claim 9, wherein a predefined frequency range corresponds to at least one of: the number of duplex filters, and the duplexer arrangement type.

11. The method according to claim 10, wherein the predefined frequency range is defined by at least one of:
a starting radio frequency channel number for the uplink and/or downlink;
an ending radio frequency channel number for the uplink and/or downlink; and
a width expressed in radio frequency channel numbers supported by the user equipment.

12. The method according to claim 9, wherein a predefined number of duplex filters or a predefined duplexer arrangement type corresponds to the plurality of channel numbers.

13. The method according to claim 9, when said indication of the second part of the first operating frequency band further indicates the plurality of channel numbers, wherein the plurality of channel numbers is expressed as a frequency range expressed in absolute radio frequency channel numbers or frequency values in Hz.

14. A user equipment for assisting a first radio network node in the selection of one or more mobility parameters, wherein the user equipment is configured to be served by the first radio network node on a first operating frequency band, and wherein the user equipment comprises:
a transmitter configured to send, to the first radio network node, an indication of a second part of the first operating frequency band, wherein the second part is supported by the user equipment, thereby assisting the first radio network node in said selection of said one or more mobility parameters, which selection is based on said indication of the second part of the first operating frequency band;
a receiver configured to receive one or more mobility parameters from the first radio network node; and
a processing circuit configured to apply said one or more mobility parameters.

15. The user equipment according to claim 14, wherein the user equipment is configured to be served by the first radio network node only on the second part of the first operating frequency band.

16. The user equipment according to claim 14, wherein the receiver further is configured to receive, from the first radio network node, a request for capabilities of the user equipment, and to respond to said request by sending said indication of the second part of the first operating frequency band.

17. The user equipment according to claim 14, wherein the processing circuit further is configured to apply said one or more mobility parameters for performing a mobility procedure or a measurement procedure.

18. A method in a first radio network node for selecting one or more mobility parameters, wherein the first radio network node serves a user equipment on a first operating frequency band and wherein said one or more mobility parameters are to be used by the user equipment, wherein the method comprises:
receiving, from the user equipment, an indication of a second part of the first operating frequency band, wherein the second part is supported by the user equipment;
selecting one or more mobility parameters based on the received indication of the second part of the first operating frequency band; and
sending the selected one or more mobility parameters to the user equipment.

19. The method according to claim 18, wherein the first radio network node serves the user equipment only on the second part of the first operating frequency band.

20. The method according to claim 18, wherein the method further comprises:
sending, to the user equipment, a request for capabilities of the user equipment, and wherein the capabilities of the user equipment are indicated by said indication of the second part of the first operating frequency band.

21. The method according to claim 18, wherein said one or more mobility parameters is used by the user equipment for performing a mobility procedure or a measurement procedure.

22. The method according to claim 21 wherein the mobility procedure is at least one of: a handover, a cell change, a cell reselection, a Radio Resource Control (RRC) redirection upon connection release, and an RRC re-establishment.

23. The method according to claim 21, wherein the measurement procedure is at least one of: a Common Pilot Channel (CPICH) measurement, a Reference Signal Received Power (RSRP) measurement, a Reference Signal Received Quality (RSRQ) measurement, a cell identification measurement, a reading of system information, a positioning measurement, and a measurement for minimizing drive test (MDT).

24. The method according to claim 23, wherein the positioning measurement includes one or more of: a reference signal time difference (RSTD) measurement on positioning reference signals (PRS) in observed time difference of arrival (OTDOA), a user equipment receive-transmit (UE Rx-Tx) time difference measurement, a reference signal received power (RSRP) measurement, and a reference signal received quality (RSRQ) measurement.

25. The method according to claim 23, wherein the measurement for MDT includes one or more of: a Block Error Rate (BLER) measurement of Physical Downlink Control Channel (PDCCH), a BLER measurement of a paging channel, and a signal strength measurement over a certain time, and a signal quality measurement over a certain time.

26. The method according to claim 18, wherein said one or more mobility parameters indicates channel numbers in a handover command.

27. The method according to claim 26, wherein the selecting of said mobility parameters is performed by setting the mobility parameter to indicate one or more channel numbers supported by the user equipment as given by the indication of the second part of the first operating frequency band.

28. The method according to claim 18, wherein said indication of the second part of the first operating frequency band further indicates at least one of:
one or more parameters associated with supported duplexer arrangement characteristics,
a duplexer arrangement type of the user equipment,
a number of duplex filters comprised in the user equipment, and
a plurality of channel numbers supported by the user equipment for the first operating frequency band.

29. The method according to claim 28, wherein a predefined frequency range corresponds to at least one of the number of duplex filters, and the duplexer arrangement type.

30. The method according to claim 28, wherein a predefined number of duplex filters or a predefined duplexer arrangement type corresponds to the plurality of channel numbers.

31. The method according to claim 30, wherein said indication of the second part of the first operating frequency band further indicates the plurality of channel numbers, wherein the plurality of channel numbers is expressed as a frequency range expressed in absolute radio frequency channel numbers or frequency values in Hz.

32. The method according to claim 31, wherein the predefined frequency range is defined by at least one of:
a starting radio frequency channel number for the uplink and/or downlink;
an ending radio frequency channel number for the uplink and/or downlink; and
a width expressed in radio frequency channel numbers supported by the user equipment.

33. The method according to claim 18, wherein the method further comprises:
sending, to a second radio network node, the indication of the second part of the first operating frequency band.

34. The method according to claim 18, wherein the method further comprises:
sending, to a third network node, the indication of the second part of the first operating frequency band.

35. The method according to claim 34, wherein the received indication of the second part of the first operating frequency band is used for one or more radio network management tasks.

36. The method according to claim 35, wherein said one or more radio network management tasks comprise at least one of network planning, network dimensioning, radio resource management, and setting of one or more mobility parameters.

37. A first radio network node for selecting one or more mobility parameters, wherein the first radio network node is configured to serve a user equipment on a first operating frequency band and wherein said one or more mobility parameters is to be used by the user equipment, wherein the first radio network node comprises:
a receiver configured to receive, from the user equipment, an indication of a second part of the first operating frequency band, wherein the second part is supported by the user equipment;
a processing circuit configured to select one or more mobility parameters based on the received indication of the second part of the first operating frequency band; and a transmitter configured to send the selected one or more mobility parameters to the user equipment.

38. The first radio network node according to claim 37, wherein the first radio network node is configured to serve the user equipment only on the second part of the first operating frequency band.

39. The first radio network node according to claim 37, wherein the transmitter further is configured to send, to the user equipment, a request for capabilities of the user equipment, wherein the capabilities of the user equipment are indicated by said indication of the second part of the first operating frequency band.

40. The first radio network node according to claim 37, wherein said one or more mobility parameters are to be used by the user equipment for performing a mobility procedure or a measurement procedure.

41. The first radio network node according to claim 37, wherein the transmitter further is configured to send, to a second radio network node, the indication of the second part of the first operating frequency band.

42. The first radio network node according to claim 37, wherein the transmitter further is configured to send, to a third network node, the indication of the second part of the first operating frequency band.

43. The first radio network node according to claim 42, wherein the received indication of the second part of the first operating frequency band is to be used for one or more radio network management tasks.

44. The first radio network node according to claim 43, wherein said one or more radio network management tasks comprise at least one of network planning, network dimensioning, radio resource management, and setting of one or more mobility parameters.

* * * * *